United States Patent
Stolbikov et al.

(10) Patent No.: US 12,143,510 B2
(45) Date of Patent: Nov. 12, 2024

(54) COMPUTING DEVICE DIGITAL CERTIFICATES THAT INCLUDE A GEOGRAPHIC EXTENSION

(71) Applicant: Lenovo (United States) Inc., Morrisville, NC (US)

(72) Inventors: Igor Stolbikov, Apex, NC (US); Scott Li, Cary, NC (US); Rod D. Waltermann, Rougemont, NC (US); Chunling Han, Beijing (CN)

(73) Assignee: Lenovo (United States) Inc., Morrisville, NC (US)

( * ) Notice: Subject to any disclaimer, the term of this patent is extended or adjusted under 35 U.S.C. 154(b) by 7 days.

(21) Appl. No.: 17/710,760

(22) Filed: Mar. 31, 2022

(65) Prior Publication Data
US 2023/0318852 A1  Oct. 5, 2023

(51) Int. Cl.
*H04L 29/06* (2006.01)
*H04L 9/30* (2006.01)
*H04L 9/32* (2006.01)
*H04L 9/40* (2022.01)

(52) U.S. Cl.
CPC .......... *H04L 9/3268* (2013.01); *H04L 9/3066* (2013.01); *H04L 63/107* (2013.01)

(58) Field of Classification Search
None
See application file for complete search history.

(56) References Cited

U.S. PATENT DOCUMENTS

| 5,659,617 A | * | 8/1997 | Fischer | H04L 9/3297 380/258 |
| 6,377,810 B1 | * | 4/2002 | Geiger | H04W 12/02 455/456.2 |
| RE38,899 E | * | 11/2005 | Fischer | H04L 9/3263 380/258 |
| 9,692,604 B2 | * | 6/2017 | Cordeiro De Oliveira Barros | H04L 9/30 |

(Continued)

FOREIGN PATENT DOCUMENTS

| EP | 4093060 A1 | * | 11/2022 | ......... H04W 12/069 |
| WO | WO-2022243382 A1 | * | 11/2022 | ......... H04W 12/069 |

OTHER PUBLICATIONS

M. N. Sakib and C.-T. Huang, "Privacy preserving proximity testing using elliptic curves," 2016 26th International Telecommunication Networks and Applications Conference (ITNAC), Dunedin, New Zealand, 2016, pp. 121-126, doi: 10.1109/ATNAC.2016.7878794. (Year: 2016).*

(Continued)

*Primary Examiner* — Jeffery L Williams
(74) *Attorney, Agent, or Firm* — Kunzler Bean & Adamson

(57) ABSTRACT

Methods, apparatus, and computer program products for computing device digital certificates that include a geographic extension are disclosed herein. One method includes a processor managing a digital certificate for a first computing device, in which the digital certificate includes a geographic extension, and populating the geographic extension with a distance value that enables the digital certificate to be validated via the populated geographic extension. Apparatus and computer program products that include hardware and/or software that can perform the methods for computing device digital certificates that include a geographic extension are also disclosed herein.

17 Claims, 18 Drawing Sheets

(56) References Cited

U.S. PATENT DOCUMENTS

| | | | | |
|---|---|---|---|---|
| 11,640,469 | B2* | 5/2023 | Canada | G06F 21/577 726/25 |
| 2005/0240765 | A1* | 10/2005 | Genty | H04L 9/3263 713/175 |
| 2009/0235071 | A1* | 9/2009 | Bellur | H04W 12/082 713/158 |
| 2010/0109835 | A1* | 5/2010 | Alrabady | H04L 63/0823 340/5.2 |
| 2016/0248594 | A1* | 8/2016 | Barros | H04L 9/3263 |
| 2017/0141925 | A1* | 5/2017 | Camenisch | H04L 63/0823 |
| 2019/0007210 | A1* | 1/2019 | Joye | H04L 9/0662 |
| 2022/0358241 | A1* | 11/2022 | Palakodety | G16H 15/00 |
| 2023/0280477 | A1* | 9/2023 | Seth | G16H 50/30 342/357.23 |
| 2023/0318852 | A1* | 10/2023 | Stolbikov | H04L 9/3268 713/156 |
| 2024/0080207 | A1* | 3/2024 | Brotherson | H04L 9/3268 |

OTHER PUBLICATIONS

Raya, M., & Hubaux, J. (2007). Securing vehicular ad hoc networks. J. Comput. Secur., 15, 39-68. (Year: 2007).*

Msahli et al., "TLS Authentication using IEEE 1609.2 certificate", Network Working Group, Aug. 14, 2019, p. 1-23. (Year: 2019).*

X. Wang, A. Pande, J. Zhu and P. Mohapatra, "STAMP: Enabling Privacy-Preserving Location Proofs for Mobile Users," in IEEE/ACM Transactions on Networking, vol. 24, No. 6, pp. 3276-3289, Dec. 2016, doi: 10.1109/TNET.2016.2515119. (Year: 2016).*

Nasrulin, B., Muzammal, M., Qu, Q. (2018). A Robust Spatio-Temporal Verification Protocol for Blockchain. In: Hacid, H., Cellary, W., Wang, H., Paik, HY., Zhou, R. (eds) Web Information Systems Engineering—WISE 2018. WISE 2018. Lecture Notes in Computer Science( ), vol. 11233. Springer, Cham. (Year: 2018).*

Mascetti, S., Freni, D., Bettini, C. et al. Privacy in geo-social networks: proximity notification with untrusted service providers and curious buddies. The VLDB Journal 20, 541-566 (2011). https://doi.org/10.1007/s00778-010-0213-7 (Year: 2011).*

Liu, B., Zhang, L., Domingo-Ferrer, J. (2014). On the Security of a Privacy-Preserving Key Management Scheme for Location Based Services in VANETs. In: Foundations and Practice of Security. FPS 2013. Lecture Notes in Computer Science( ), vol. 8352, Springer, Cham. (Year: 2014).*

S. Gambs, M.-O. Killijian, M. Roy and M. Traoré, "PROPS: A PRivacy-Preserving Location Proof System," 2014 IEEE 33rd International Symposium on Reliable Distributed Systems, Nara, Japan, 2014, pp. 1-10, doi: 10.1109/SRDS.2014.37. (Year: 2014).*

Dong, Changyu & Dulay, Naranker. (2011). Longitude: A Privacy-Preserving Location Sharing Protocol for Mobile Applications. IFIP Advances in Information and Communication Technology. 358. 133-148. 10.1007/978-3-642-22200-9_12. (Year: 2011).*

\* cited by examiner

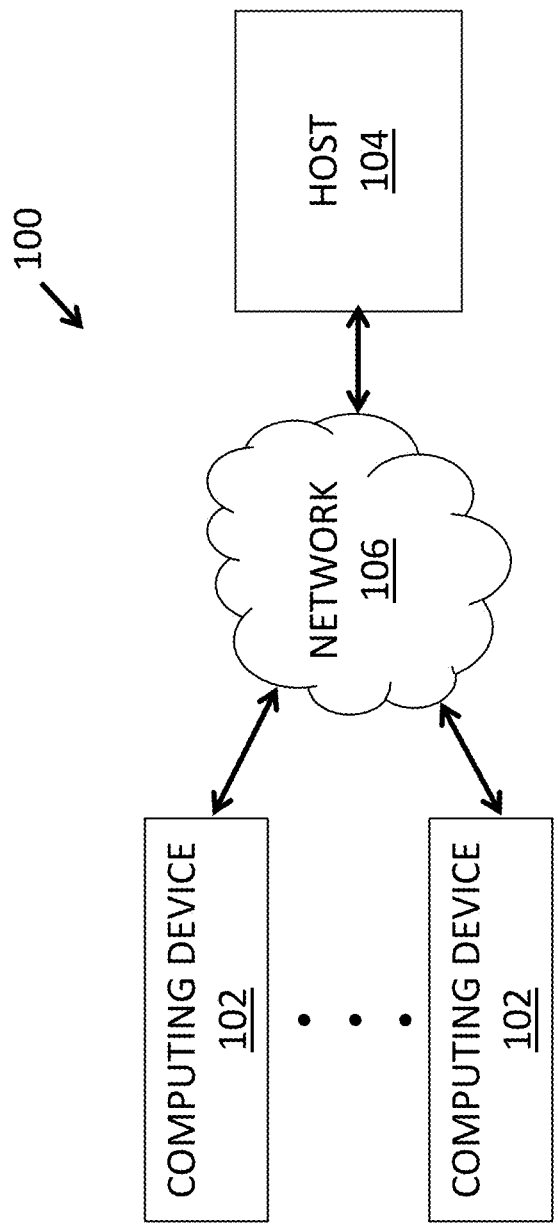

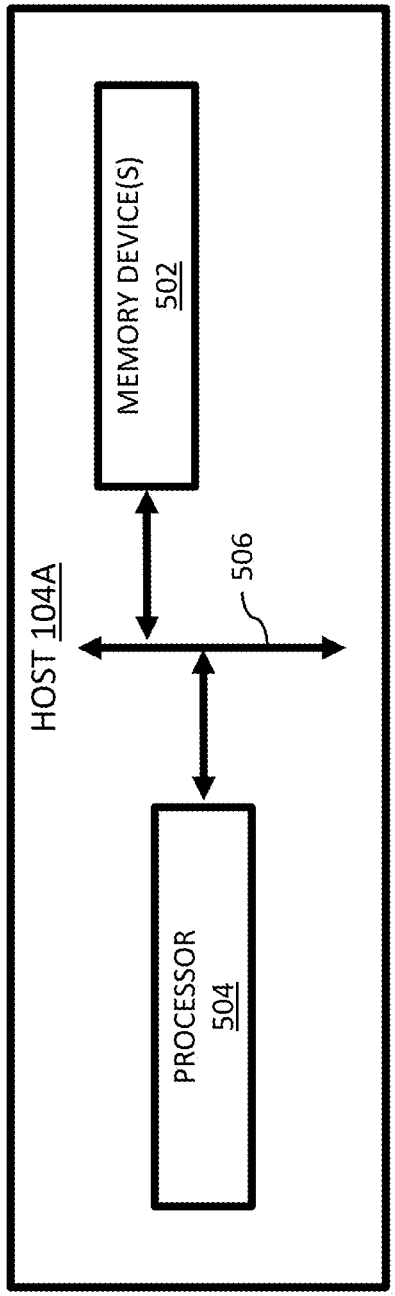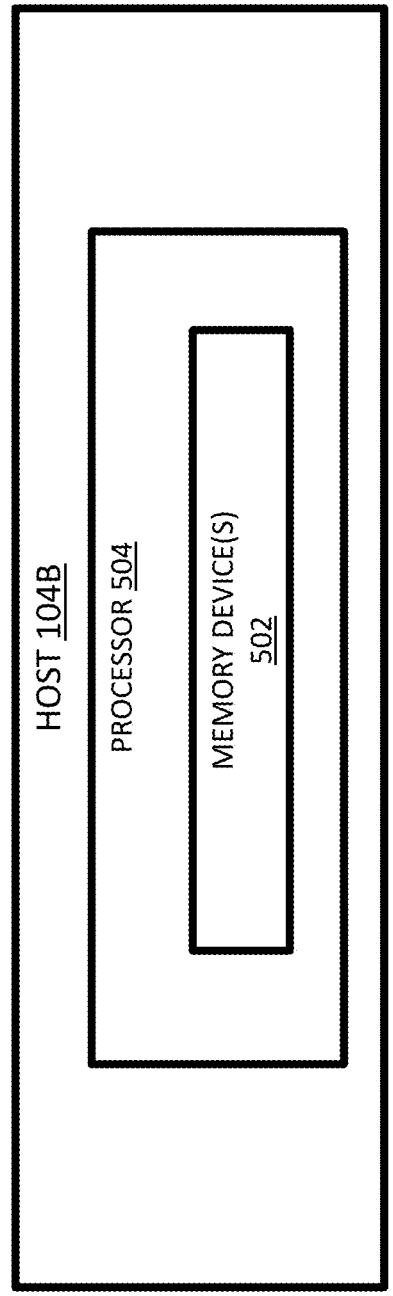
FIG. 5A
FIG. 5B

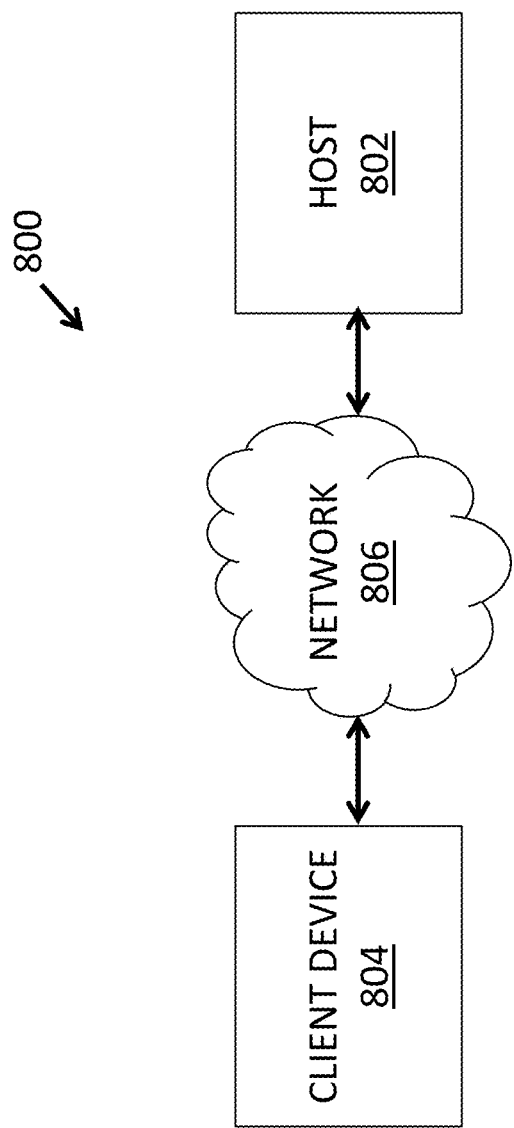

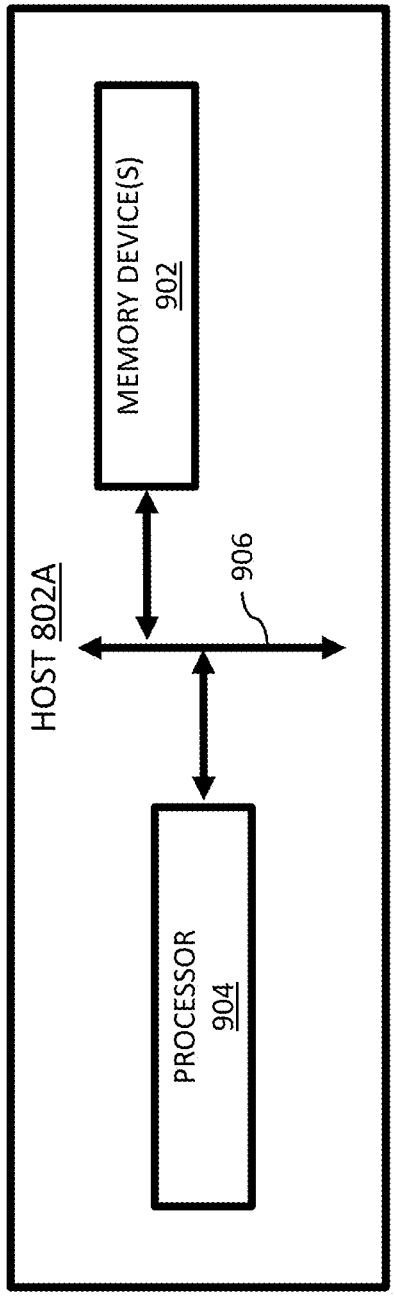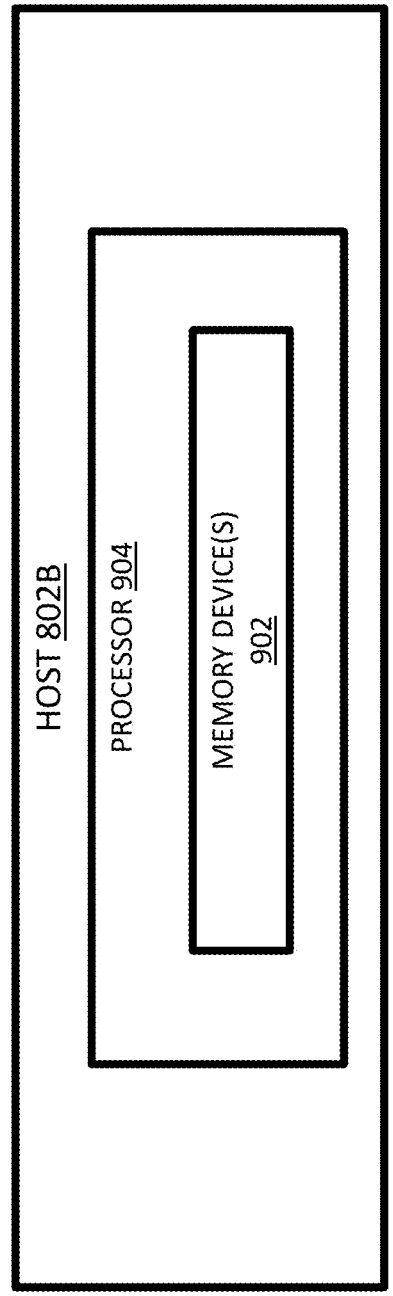

COMPUTING DEVICE DIGITAL CERTIFICATES THAT INCLUDE A GEOGRAPHIC EXTENSION

FIELD

The subject matter disclosed herein relates to computing devices and, more particularly, relates to computing device digital certificates that include a geographic extension.

BACKGROUND

Digital certificates for a computing device are traditionally geographically agnostic. That is, contemporary computing device digital certificates are not designed to prevent a computing device from being used when the computing device is geographically located outside a predefined area relative to a reference point and/or preventing the computing device from accessing another computing device when the computing device is geographically located outside a predefined area relative to the other computing device.

BRIEF SUMMARY

Apparatus, methods, and computer program products for computing device digital certificates that include a geographic extension are disclosed herein. An apparatus, in one embodiment, includes a processor and a memory that stores code executable by the processor. In certain embodiments, the code is executable by the processor to manage a digital certificate for a first computing device, in which the digital certificate includes a geographic extension, and populate the geographic extension with a distance value that enables the digital certificate to be validated via the populated geographic extension.

One embodiment of a method for computing device digital certificates that include a geographic extension includes a processor managing a digital certificate for a first computing device in which the digital certificate includes a geographic extension. In some embodiments, the method further includes the processor populating the geographic extension with a distance value that enables the digital certificate to be validated via the populated geographic extension.

A computer program product for computing device digital certificates includes a computer-readable storage medium including program instructions embodied therewith. In certain embodiments, the program instructions are executable by a processor to cause the processor to manage a digital certificate for a first computing device, in which the digital certificate includes a geographic extension, and populate the geographic extension with a distance value that enables the digital certificate to be validated via the populated geographic extension.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 1 is a schematic diagram illustrating one embodiment of a computing system including computing device digital certificates that include a geographic extension;

FIGS. 5A and 5B are schematic block diagrams illustrating various embodiments of a host computing device included in the computing system of FIG. 1;

FIG. 8 is a schematic diagram illustrating another embodiment of a computing system including computing device digital certificates that include a geographic extension;

FIGS. 9A and 9B are schematic block diagrams illustrating various embodiments of a host computing device included in the computing system of FIG. 8;

DETAILED DESCRIPTION

Figure 2A:
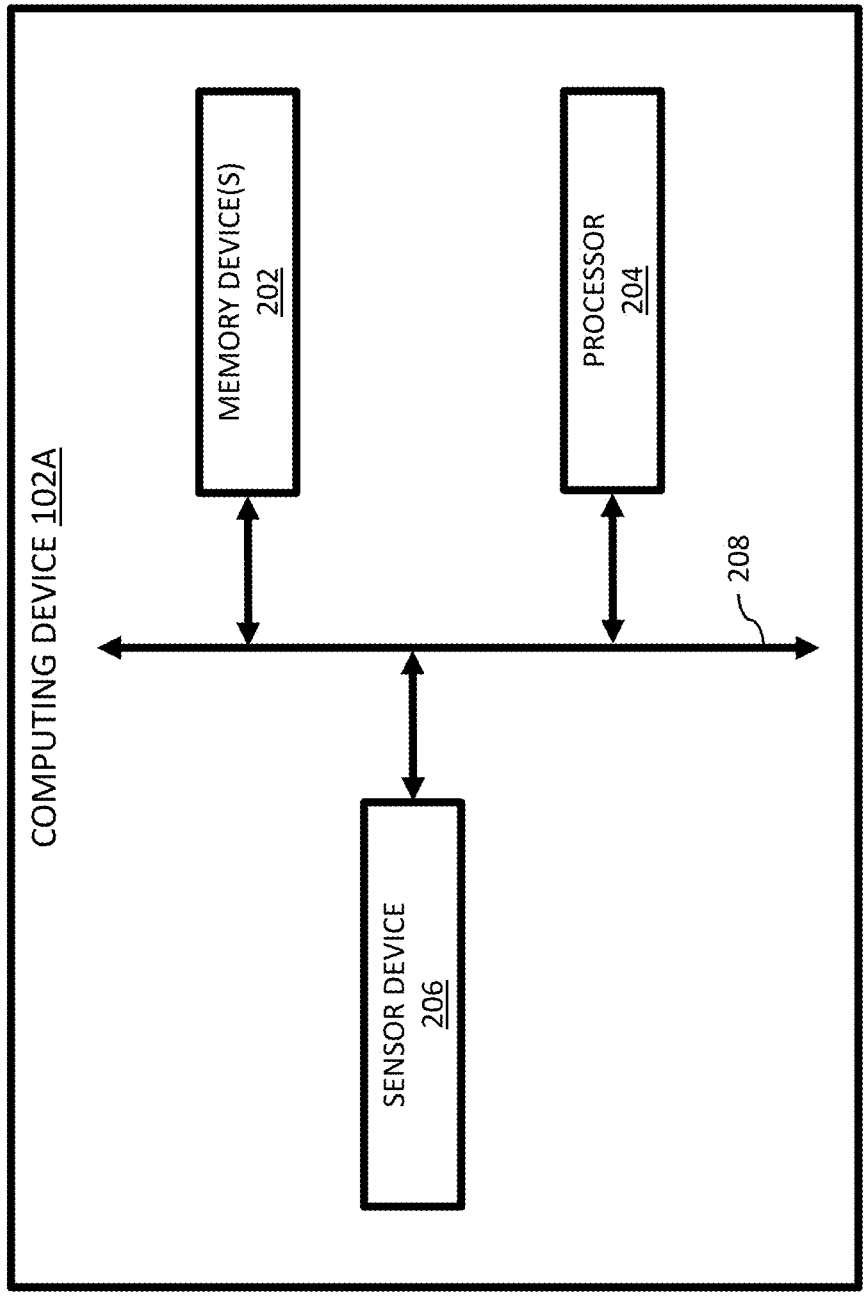
FIGS. 2A and 2B are schematic block diagrams illustrating various embodiments of a computing device included in the computing system of FIG. 1.

As will be appreciated by one skilled in the art, aspects of the embodiments may be embodied as systems, apparatuses, methods, or computer program products. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to emphasize their implementation independence more particularly. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

In addition, as used herein, the term, "set," can mean one or more, unless expressly specified otherwise. The term, "sets," can mean multiples of or a plurality of one or mores, ones or more, and/or ones or mores consistent with set theory, unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The various embodiments disclosed herein provide apparatuses, methods, and computer program products for computing device digital certificates that include a geographic extension. An apparatus, in one embodiment, includes a processor and a memory that stores code executable by the processor. In certain embodiments, the code is executable by the processor to manage a digital certificate for a first computing device, in which the digital certificate includes a geographic extension, and populate the geographic extension with a distance value that enables the digital certificate to be validated via the populated geographic extension.

One embodiment of a method for computing device digital certificates that include a geographic extension includes a processor managing a digital certificate for a first computing device in which the digital certificate includes a geographic extension. In some embodiments, the method further includes the processor populating the geographic extension with a distance value that enables the digital certificate to be validated via the populated geographic extension.

A computer program product for computing device digital certificates includes a computer-readable storage medium including program instructions embodied therewith. In certain embodiments, the program instructions are executable by a processor to cause the processor to manage a digital certificate for a first computing device, in which the digital certificate includes a geographic extension, and populate the geographic extension with a distance value that enables the digital certificate to be validated via the populated geographic extension.

Turning now to the drawings, FIG. 1 is block diagram of one embodiment of a computing system 100 that includes and/or can provide computing device digital certificates that include a geographic extension. The computing system 100 may include and/or form at least a portion of any suitable type of computing system and/or particular computing system that is known or developed in the future.

In various embodiments, the computing system 100 may include and/or form at least a portion of a home edge system/network, a datacenter system/network, and/or a communication system/network (e.g., a cellular system/network, a vehicle communication system/network, an internal office communication system/network, etc.), etc., among other types of systems/networks and/or particular systems/networks that are possible, each of which is contemplated herein. That is, the computing system 100 may include and/or form at least a portion of any suitable system and/or suitable network that is capable of benefitting from and/or utilizing Transport Layer Security (TLS) and end user digital certificates with enhanced security features that can be locked and/or limited to a predetermined/predefined geographic boundary and/or within a specific geographic location. At least in the embodiment illustrated in FIG. 1, a computing system 100 includes, among other components and/or features, a set of computing devices 102 (also referred to herein simply as, computing device(s) 102) and a host computing device 104 (or host 104) coupled to and/or in communication with each other via and/or over a network 106.

A set of computing devices 102 may include any suitable quantity of computing devices 102. That is, while the embodiment of a computing system 100 illustrated in FIG. 1 is shown as including two (2) computing devices 102, various other embodiments of a computing system 100 may include one (1) computing device 102 or a quantity of computing devices 102 greater than two computing devices 102 (e.g., three (3) or more computing devices 102).

A computing device 102 may include any suitable type of computing device and/or computing device that is known or developed in the future. In some embodiments, a computing device 102 may include and/or form a client device. Further, a computing device 102 may also include and/or be referred to herein as, an information handling device. Examples of a computing device 102 include, but are not limited to, a laptop computer, a desktop computer, a personal digital assistant (PDA), a tablet computer, a smart phone, a cellular telephone, a wearable device (e.g., a smart watch, a smart ring, a fitness tracker, etc.), an Internet of Things (IoT) device, a game console, an on-board computer of a vehicle (e.g., a motor vehicle (e.g., an automobile, truck, bus, motorcycle, etc.), an aquatic vehicle (e.g., a boat, ship, submarine, etc.), and an aircraft (e.g., an airplane, helicopter, unmanned/uncrewed aerial vehicle (UAV), drone, blimp, hot air balloon, airship, rocketship, space shuttle, space station, etc.), etc.), a streaming device, a smart device (e.g., a smart speaker (e.g., Alexa®, Echo®, Google Home®, etc.), a smart hub, and a stick device (e.g., Fire Stick®, Roku Stick®, etc.), etc.), and a digital assistant, etc., among other types of computing systems/devices and/or specific computing systems/devices that can perform the functions and/or operations of a computing device 102 discussed herein that are possible, each of which is contemplated herein.

A host 104 may include any suitable type of computing device and/or computing device that is known or developed in the future. In some embodiments, a host 104 may include and/or form at least a portion of a server system and/or a set of server devices (e.g., computing hardware and/or software that provides a set of computing services). Further, a host 104 may also include and/or be referred to herein as, an information handling device. Examples of a host 104 include, but are not limited to, a server, a laptop computer, a desktop computer, a PDA, a tablet computer, a smart phone, a cellular telephone, a wearable device (e.g., a smart watch, a smart ring, a fitness tracker, etc.), an IoT device, a game console, an on-board computer of a vehicle (e.g., a motor vehicle (e.g., an automobile, truck, bus, motorcycle, etc.), an aquatic vehicle (e.g., a boat, ship, submarine, etc.), and an aircraft (e.g., an airplane, helicopter, unmanned/uncrewed aerial vehicle (UAV), drone, blimp, hot air balloon, airship, rocketship, space shuttle, space station, etc.), etc.), a streaming device, a smart device (e.g., a smart speaker (e.g., Alexa®, Echo Google Home®, etc.), a smart hub, and a stick device (e.g., Fire Stick®, Roku Stick®, etc.), etc.), and a digital assistant, etc., among other types of computing systems/devices and/or specific computing systems/devices that can perform the functions and/or operations of a host 104 discussed herein that are possible, each of which is contemplated herein.

A network 106 may include any suitable type of wired and/or wireless network and/or particular wired and/or wireless network (e.g., public and/or private computer networks in any number and/or configuration (e.g., the Internet, an intranet, a cloud network, etc.)) that is known or developed in the future that enables the computing device(s) 102 and the host 104 to be coupled to, communicate with, and/or to share resources with each other. In various embodiments, the network 106 can include the Internet, a cloud network (IAN), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of communicating, sharing data, and/or sharing resources with one another that are possible and contemplated herein.

Referring to FIG. 2A, FIG. 2A is a block diagram of one embodiment of a computing device 102A. At least in the embodiment illustrated in FIG. 2A, a computing 102A includes, among other components and/or features, a set of memory devices 202, a processor 204, and a sensor device 206 coupled to and/or in communication with one another via a bus 208 (e.g., a wired and/or wireless bus).

A set of memory devices 202 may include any suitable quantity of memory devices 202. Further, a memory device 202 may include any suitable type of device and/or system that is known or developed in the future that can store computer-useable code and/or computer-readable code. In various embodiments, a memory device 202 may include one or more non-transitory computer-usable mediums (e.g., readable, writable, readable-writable, etc.), which may include any non-transitory and/or persistent apparatus or device that can contain, store, communicate, propagate, and/or transport applications, instructions, data, computer programs, software, code, routines, etc., for processing by or in connection with a computer processing device (e.g., processor 204).

A memory device 202, in some embodiments, includes volatile computer storage media. For example, a memory device 202 may include random access memory (RAM), including dynamic RAM (DRAM), synchronous dynamic RAM (SDRAM), and/or static RAM (SRAM). In other embodiments, a memory device 202 includes non-volatile computer storage media. For example, a memory device 202 may include flash memory and/or any other suitable non-volatile computer storage device that is known or developed in the future. In various embodiments, a memory device 202 includes both volatile and non-volatile computer storage media.

Figure 3A:
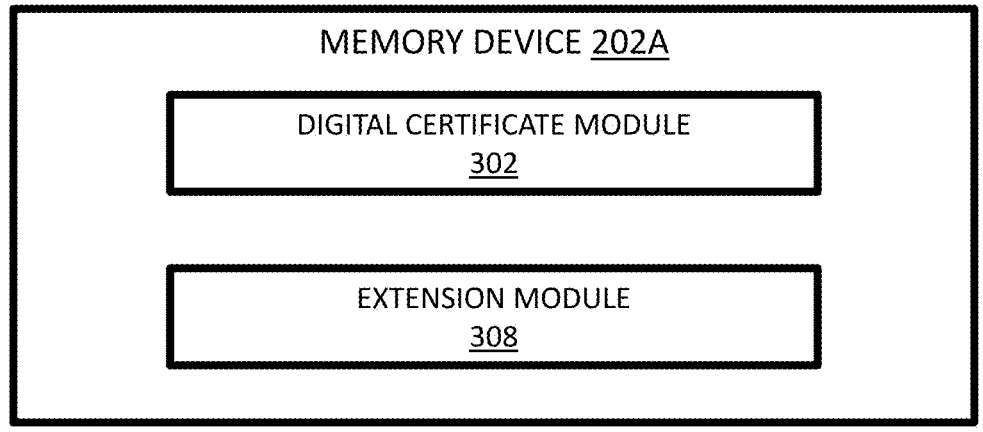
FIGS. 3A and 3B are schematic block diagrams illustrating various embodiments of a memory device included in the computing devices of FIGS. 2A and 2B.

With reference to FIG. 3A, FIG. 3A is a block diagram of one embodiment of a memory device 202A included in a computing device 102. At least in the embodiment illustrated in FIG. 3A, a memory device 202A includes, among other components and/or features, a digital certificate module 302 and an extension module 308 that are each configured to operate/function in conjunction with one another when executed by a processor (e.g., processor 204) to generate, store, provide, manage, and/or maintain, etc. computing device digital certificates that include a geographic extension.

A digital certificate module 302 may include any suitable hardware and/or software that is known or developed in the future that can manage a computing device digital certificate (e.g., a digital certificate for a computing device 102). The digital certificate module 302 can manage a computing device digital certificate (or simply, digital certificate) using any suitable technology, process, method, and/or technique that is known or developed in the future. In various embodiments, the digital certificate module 302, in managing a digital certificate for a computing device 102, is configured to generate, store, provide, manage, and/or maintain the digital certificate in a memory device 202, among other operations and/or functions that can include and/or define managing a digital certificate for a computing device 102 that are possible and contemplated herein.

A digital certificate may include any suitable type of digital certificate and/or particular digital certificate that is known or developed in the future that can share a public key as part of an encryption and/or authentication process, technique, and/or method. That is, a digital certificate can include any type of digital certificate and/or particular digital certificate that can cryptographically link ownership of a public key with the entity that owns the public key and can also be referred to as, a public key certificate. In certain embodiments, a digital certificate can be distributed, authenticated, and revoked as part of a public key infrastructure (PKI).

In various embodiments, the digital certificate for the computing device 102 includes an X.509 certificate based on the International Telecommunications Union (ITU) X.509 standard. In some embodiments, the X.509 certificate includes a set of extensions, as set forth in version 3 of the X.509 standard for X.509 certificates. That is, version 3 of the X.509 standard for X.509 certificates allows and/or enables an X.509 certificate to add one or more additional fields in the X.509 certificate. Details on the version 3 extension format can be found at Request For Comments 5280 (RFC 5280).

A set of extensions included in an X.509 certificate may include any suitable quantity of extensions that can be used to validate and/or facilitate validating an X.509 certificate. In various embodiments, an X.509 certificate includes at least a geographic extension that can be used in validating and/or facilitate validating the X.509 certificate. The geographic extension, in certain embodiments, is defined by name, criticality, and a distance value, which represent a one-way encrypted value of the current location of a computing device 102. The one-way encrypted value of the current location of the computing device 102 included in the geographic extension, in various embodiments, allows and/or enables a validating computing device (e.g., a computing device that is attempting to validate and/or is validating the X.509 certificate (e.g., host 104)) to identify and/or "see" the distance between the validating computing device and the current location of the computing device 102.

In certain embodiments, the validating computing device is only able to identify and/or "see" the distance between the validating computing device and the current location of the computing device 102. Here, the validating computing device is not able to identify, know, and/or "see" that actual current location and/or precise current location of the computing device 102 because the geographic extension only includes a distance value that can be used by the validating device to calculate the current distance between the validating computing device and the computing device 102. That is, the distance value is not a location value and/or does not include location coordinates for the current position/location of the computing device 102, nor can the distance value be reversed engineered/calculated to identify and/or see the current location/position of the computing device 102. In this manner, the distance value and/or the geographic extension can provide privacy (e.g., differential privacy) to a computing device 102.

In various embodiments, the geographic extension is a field in the X.509 certificate that can be populated with the distance value. That is, the field for the geographic extension in the X.509 certificate can be populated with the distance value in response to calculating and/or determining the distance value, as discussed elsewhere herein.

An extension module 308 may include any suitable hardware and/or software that is known or developed in the future that can manage a set of extensions included in a digital certificate for a computing device 102. The extension module 308 can manage an extension using any suitable technology, process, method, and/or technique that is known or developed in the future.

In various embodiments, the extension module 308, in managing an extension included in a digital certificate for a computing device 102, is configured to populate one or more fields in the extension, among other operations and/or functions related to managing an extension. In certain embodiments, the extension module 308 is configured to populate a field in a geographic extension with a distance value.

The extension module 308 may populate a field (e.g., a distance value field) in the geographic extension with the distance value utilizing any suitable process, method, and/or technique that is known or developed in the future capable of populating and/or otherwise inserting the distance value into the field or distance value field. In various embodiments, the extension module 308 is configured to populate the field or distance value field in the geographic extension with the distance value in response to receiving the distance value. That is, the extension module 308 is configured to receive the distance value and populate the field or distance value field in the geographic extension with the received distance value, as discussed below.

Figure 3B:
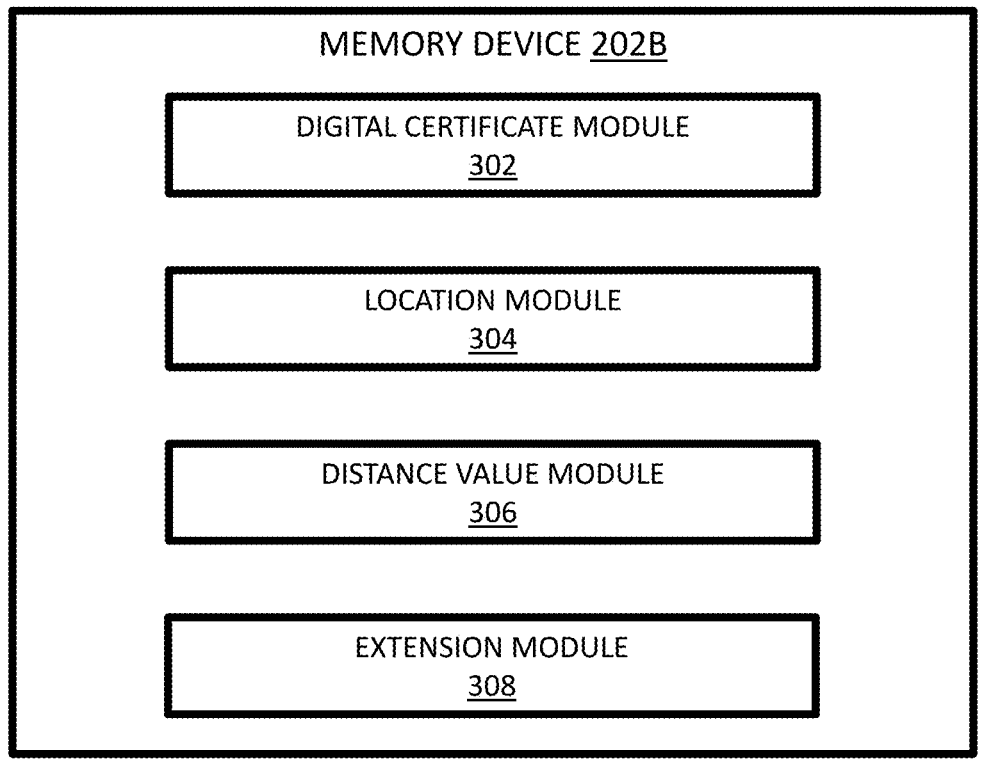

With reference to FIG. 3B, FIG. 3B is a block diagram of another embodiment of a memory device 202B. The memory device 202B includes a digital certificate module 302 and an extension module 308 similar to the digital certificate module 302 and extension module 308 included in the memory device 202A discussed with reference to FIG. 3A. At least in the illustrated embodiment, the memory device 202B further includes, among other components and/or features, a location module 304 and a distance value module 306.

A location module 304 may include any suitable hardware and/or software that can determine a current location/position for a computing device 102. The location module 304 may determine the current location/position of a computing device 102 using any suitable technology/technologies, device(s), process(es), method(s), and/or technique(s) that is/are known or developed in the future.

Figure 2B:
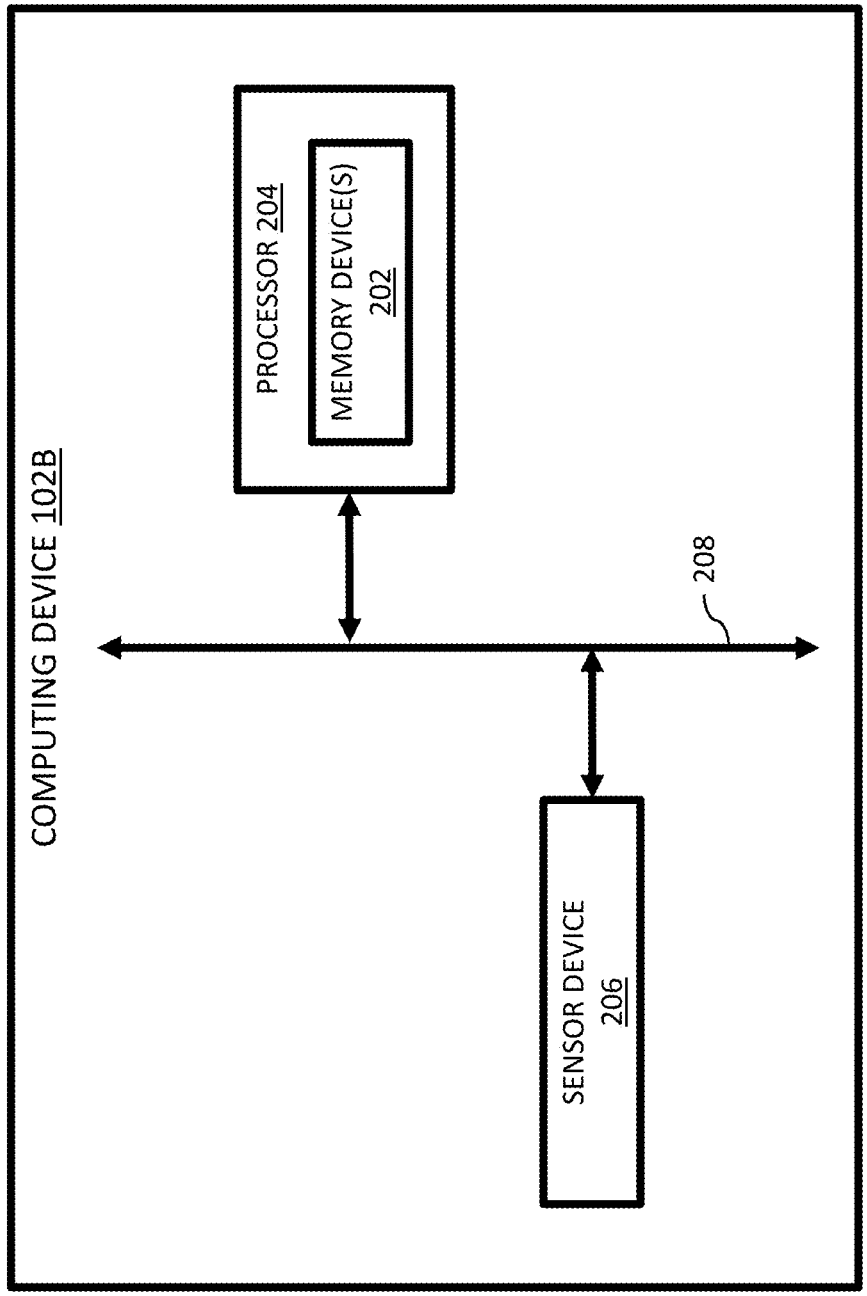

In various embodiments, the location module 304 is configured to determine a current location/position for a computing device 102 based on sensor data received from a sensor device (see, e.g., sensor device 206 in FIGS. 2A and 2B). Here, the sensor data can identify the current location/position of the computing device 102 based on the sensor device 206 detecting one or more physical characteristics of the environment surrounding the sensor device 206.

In some embodiments, the sensor device 206 includes a Global Positioning System (GPS) and the sensor data generated by the GPS. Here, the sensor data identifies a latitude point and a longitude point on a geographic coordinate system and the location module 304 determines the current location/position of the computing device 102 based on the latitude point and longitude point identified in the sensor data.

The location module 304 is configured to transmit the current location/position (e.g., the latitude and longitude points) of the computing device 102 to the distance value module 306 for processing by the distance value module 306. The distance value module 306 is configured to receive and process the current location/position of the computing device 102 from the location module 304.

A distance value module 306 may include any suitable hardware and/or software than can calculate and/or derive a distance value for populating a field of a geographic extension. In various embodiments, the distance value module 306 is configured to generate a distance value based on the current location/position (e.g., the latitude and longitude points) of the computing device 102 determined by and received from the location module 304.

The distance value, in various embodiments, includes a set of values representing the current geographic location, current geographic position, current location, and/or current position of the computing device 102. The distance value may include any suitable type(s) of value and/or particular value(s) that can be utilized to determine and/or calculate a distance without identifying and/or revealing the current location/position of the computing device 102.

In some embodiments, the distance value includes one or more types of value and/or one or more values that can be utilized to determine and/or calculate a distance between the current location/position of the computing device 102 and a location/position of a validating computing device (e.g., host 104) without identifying and/or revealing the current location/position of the computing device 102. In additional or alternative embodiments, the distance value includes one or more types of value and/or one or more particular values that can be utilized to determine and/or calculate a distance between the current location/position of the computing device 102 and a set of reference locations/positions (e.g., one or more reference locations/positions, one or more objects, etc.) without identifying and/or revealing the current location/position of the computing device 102.

Figure 15:
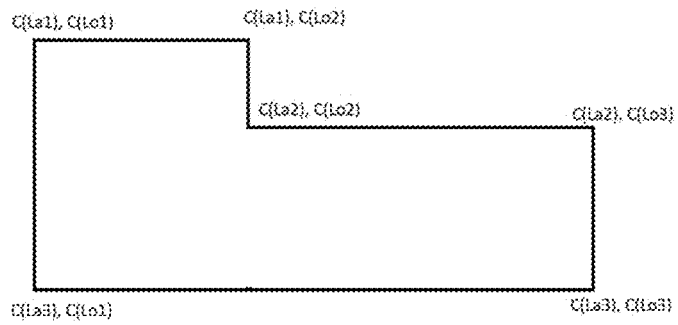
FIG. 15 is a diagram of one embodiment of a boundary or area.

In further additional or alternative embodiments (see, e.g., FIG. 15), the distance value includes one or more types of value and/or one or more particular values that can be utilized to determine and/or calculate whether the current location/position of the computing device 102 is within a predetermined/preset boundary and/or predetermined/preset area (e.g., within (La1, Lo1), (La1, Lo2), (La2, Lo2), (La2, Lo3), (La3, Lo3), and (La3, Lo1)) without identifying and/or revealing the current location/position of the computing device 102. In non-limiting, the distance value may include one or more types of value and/or one or more particular values that can be utilized to determine and/or calculate whether the current location/position of the computing device 102 is within a room, a building, a campus, a borough, a city/town/village, a county, a district, a state, a province, a country, and a continent, etc. without identifying and/or revealing the current location/position of the computing device 102, among other predetermined/preset boundaries and/or predetermined/preset areas that are possible and contemplated herein. In additional or alternative non-limiting examples, the distance value may include one or more types of value and/or one or more particular values that can be utilized to determine and/or calculate whether the current location/position of the computing device 102 is within a randomly selected and/or arbitrary boundary and/or area, which may also be predetermined and/or preset, without identifying and/or revealing the current location/position of the computing device 102.

In various embodiments, the distance value includes a pair of values. In further embodiments, each value in the pair of values of the distance value includes the value of a respective elliptic-curve cryptography (ECC) point on an elliptic curve. That is, the pair of values are different ECC points on the elliptic curve and are different from one another.

In various embodiments, the distance value module 306 is configured to separately generate a first ECC point and a second ECC point (e.g., a pair of ECC points). The first and second ECC points on the elliptic curve are based on and/or are separately derived/calculated from the latitude point and longitude point received from the location module 304. Here, the pair of ECC points includes a first ECC point on the elliptic curve that is based on and/or derived/calculated from the latitude point or the longitude point and a second ECC point (a different ECC point) on the elliptic curve and is based on and/or derived/calculated from the other respective one of the latitude point or the longitude point such that the first ECC point and the second ECC point on the elliptic curve form a pair of ECC points on the elliptic curve representing the latitude point and the longitude point of the current location/position of the computing device 102.

In various embodiments, the first and second ECC points are calculated and/or derived using a blinding factor. The blinding factor, in various embodiments, includes an integer value, r.

The integer value r may be any suitable integer value that can function as a blinding factor (e.g., a non-zero integer). As such, the integer value r may be greater than or less than zero (0). In some embodiments, the integer value r is a random integer value. That is, the distance value module 306 is configured to randomly select the integer value r.

In some embodiments, the distance value module 306 is configured to use the same randomly selected integer value r in generating both the first ECC point and the second ECC point. In other embodiments, the distance value module 306 is configured to use different randomly selected integer values r (e.g., r1 and r2) in generating the first ECC point and the second ECC point.

The distance value module 306, in various embodiments, is configured to generate a latitude (La) point on the elliptic curve by applying an elliptic curve addition operation. In some embodiments, the addition operation includes the following:

$$La(\phi_1, r) = \phi_1 * G + rH.$$

The distance value module 306, in further embodiments, is configured to generate a longitude (Lo) point on the elliptic curve by applying an elliptic curve addition operation. In some embodiments, the addition operation includes the following:

$$Lo(\lambda_1, r) = \lambda_1 * G + rH.$$

In various embodiments, elliptic curve (EC) point scalar multiplication is used for generator point G and EC point addition is used for hash H. Here, because the La point and the Lo point are private points on the elliptic curve, it is impossible or at least nearly impossible to derive the La point and the Lo point from the generator point G and the blinding factor (e.g., integer value r).

The generator point G may include any suitable public parameter of an elliptic curve that is known or developed in the future. In some embodiments, the generator point G is secp384k1, among other parameters of an elliptic curve that are possible and contemplated herein.

The hash H may include any suitable hash that is known or developed in the future. In some embodiments, the hash H is a derivative of the generator point G (e.g., to point (SHA256 (ENCODE (G))), among other hash values that are possible and contemplated herein.

As a result, the La point and Lo point can be represented as a pair of ECC points (e.g., the first ECC point and the second ECC point). Further, C(La) is an ECC point over latitude and C(Lo) is an ECC point over longitude.

In various embodiments, the distance value module 306 is configured to include C(La) and C(Lo) as at least a portion of the distance value. The distance value including C(La) and C(Lo) can be utilized in calculating short distances (or relatively short distances) and/or long distances (or relatively long distances).

In some embodiments, short distances and/or relatively short distances can include distances that are less than or equal to about one hundred (100) miles (or about 160.934 kilometers), among other distances that are greater than 100 miles that are possible and contemplated herein. Further, C(La) and C(Lo) can be used by a validating computing device (e.g., host 104) to calculate a Euclidian distance between the current location/position of the computing device 102 and the validating device without the validating device knowing the current location/position of the computing device 102. The Euclidian distance between the current location/position of the computing device 102 and the validating device can be calculated and/or derived using a Pythagorean theorem formula, as discussed elsewhere herein.

Large distances and/or relatively large distances, in some embodiments, can include distances that are greater than about 100 miles (or about 160.934 kilometers), among other distances that are less than 100 miles that are possible and contemplated herein. Further, C(La) and C(Lo) can be used by a validating computing device (e.g., host 104) to calculate a nautical distance between the current location/position of the computing device 102 and the validating device without the validating device knowing the current location/position of the computing device 102. The nautical distance between the current location/position of the computing device 102 and the validating device can be calculated and/or derived using a haversine formula, as discussed elsewhere herein.

The distance value module 306 is configured to transmit the distance value (e.g., C(La) and C(Lo)) to the extension module 308 for processing by the extension module 308. The extension module 308 is configured to receive and process the distance value. That is, the extension module 308 is configured to populate the field in the geographic extension of the X.509 certificate with the distance value (e.g., C(La) and C(Lo)) in response to receiving the distance value from the distance value module 306, as discussed elsewhere herein.

Referring back to FIG. 2A, a processor 204 may include any suitable non-volatile/persistent hardware and/or software configured to perform and/or facilitate performing functions and/or operations for computing device digital certificates that include a geographic extension. In various embodiments, the processor 204 includes hardware and/or software for executing instructions in one or more modules and/or applications that can perform and/or facilitate performing functions and/or operations for computing device digital certificates that include a geographic extension. The modules and/or applications executed by the processor 204 for computing device digital certificates that include a geographic extension can be stored on and executed from a memory device 202 (e.g., memory device 202A and memory device 202B) and/or from the processor 204.

Figure 4A:
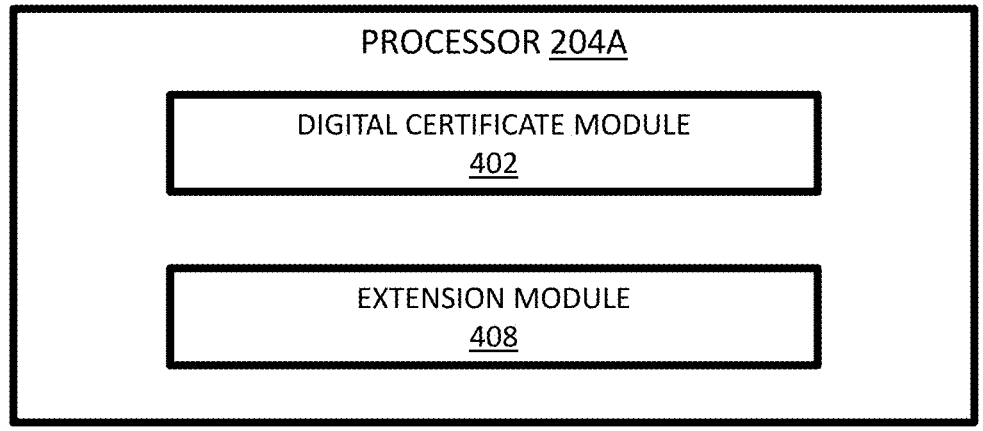
FIGS. 4A and 4B are schematic block diagrams illustrating various embodiments of a processor included in the computing devices of FIGS. 2A and 2B.

With reference to FIG. 4A, FIG. 4A is a schematic block diagram of one embodiment of a processor 204A. At least in the illustrated embodiment, the processor 204A includes, among other components and/or features, a digital certificate module 302 and an extension module 408 similar to the digital certificate module 302 and extension module 308, respectively, in the memory device 202A discussed with reference to FIG. 3A.

Figure 4B:
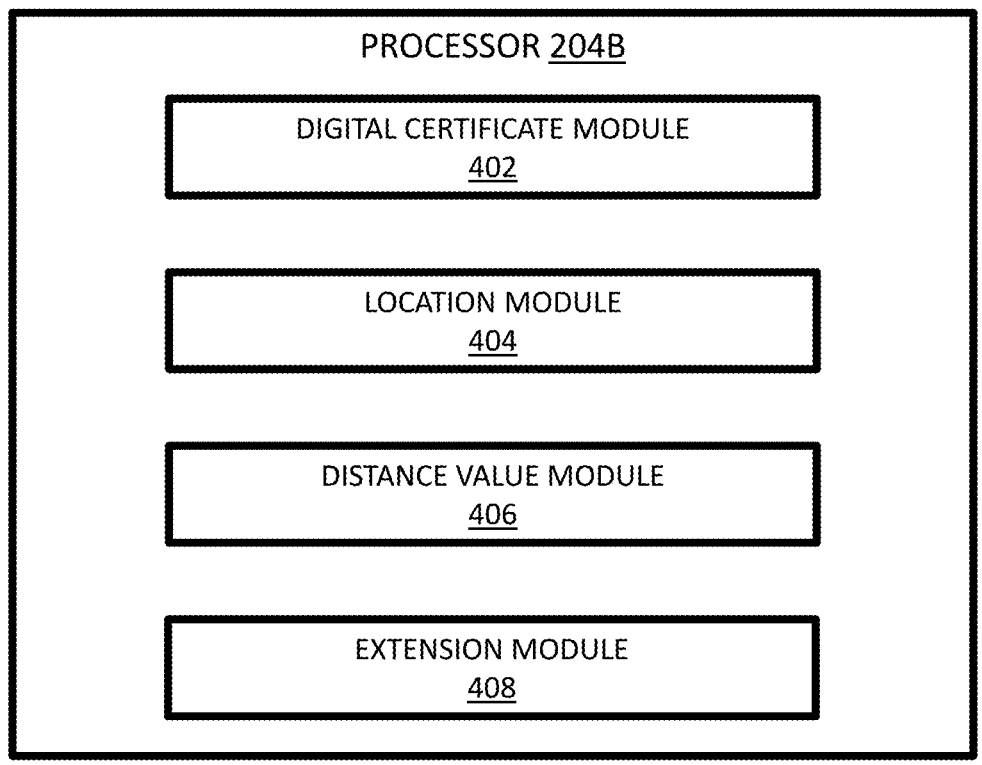

Referring to FIG. 4B, FIG. 4B is a schematic block diagram of another embodiment of a processor 204B. At least in the illustrated embodiment, the processor 204B includes, among other components and/or features, a digital certificate module 402, a location module 404, a distance value module 406, and an extension module 408 similar to the digital certificate module 302, location module 304, distance value module 306, and extension module 308, respectively, in the memory device 202B discussed with reference to FIG. 3B.

With reference again to FIG. 2A, a sensor device 206 may include any suitable sensor device 206 that is known or developed in the future that can detect, sense, and/or measure physical inputs indicative of a current location/position of the computing device 102. In various embodiments, the sensor device 206 can include any suitable device and/or system that can determine and/or identify the current latitudinal point and/or coordinate and the current longitudinal point and/or coordinate of the computing device 102. In some embodiments the sensor device 206 includes a GPS, among other devices and/or systems that can determine and/or identify the current latitudinal point and/or coordinate and the current longitudinal point and/or coordinate of the computing device 102 that are possible and contemplated herein.

Referring to FIG. 2B, FIG. 2B is a block diagram of another embodiment of a computing device 102B. At least in the illustrated embodiment, the computing device 102B includes, among other components and/or features, a set of memory devices 202, a processor 204, a sensor device 206, and a bus 208 similar to the memory device(s) 202, processor 204, sensor device 206, and bus 208 included in the embodiment of a computing device 102A illustrated in FIG. 2A. A difference between the computing device 102B and the computing device 102A is that the memory device(s) 202 of the computing device 102B are included in and/or form a portion of the processor 204, whereas the memory device(s) 202 of the computing device 102A are separate from and/or are device(s) that is/are independent from the processor 204.

In various embodiments, the processor 204 (e.g., processor 204A and processor 204B) is configured to transmit a request to the host 104 to connect to and/or access the host 104 (e.g., an attempt by the computing device 102 to connect to and/or access the host 104). In the request to connect to and/or access the host 104, the processor 204 is configured to include its digital certificate (e.g., an X.509 certificate), which includes a geographic extension populated with the distance value (e.g., C(La) and C(Lo)), as at least a portion of the request to connect to and/or access the host 104.

The digital certificate enables and/or allows the host 104 to validate the computing device 102, which can result in the computing device 102 accessing the host 104. The computing device 102 is validated by the host 104 in response to the host validating the digital certificate for the computing device 102 that includes the geographic extension, as discussed in greater detail below.

Returning to FIG. 1, the host 104 is configured to receive a request from the computing device 102 to connect to and/or access the host 104. In response to the request, the host is configured to grant the computing device's request in response to validating the computing device 102, which validation is based on validating the digital certificate for the computing device 102 included in the request.

With reference to FIG. 5A, FIG. 5A is a block diagram of one embodiment of a host 104A included in the system 100 discussed with reference to FIG. 1. At least in the illustrated embodiment, the host 104A includes, among other components and/or features, a set of memory devices 502 coupled to and/or in communication with a processor 504 via a bus 506 (e.g., a wired and/or wireless bus).

A set of memory devices 502 may include any suitable quantity of memory devices 502. Further, a memory device 502 may include any suitable type of device and/or system that is known or developed in the future that can store computer-useable code and/or computer-readable code. In various embodiments, a memory device 502 may include one or more non-transitory computer-usable mediums (e.g., readable, writable, readable-writable, etc.), which may include any non-transitory and/or persistent apparatus or device that can contain, store, communicate, propagate, and/or transport applications, instructions, data, computer programs, software, code, routines, etc., for processing by or in connection with a computer processing device (e.g., processor 504).

A memory device 502, in some embodiments, includes volatile computer storage media. For example, a memory device 502 may include random access memory (RAM), including dynamic RAM (DRAM), synchronous dynamic RAM (SDRAM), and/or static RAM (SRAM). In other embodiments, a memory device 502 includes non-volatile computer storage media. For example, a memory device 502 may include flash memory and/or any other suitable non-volatile computer storage device that is known or developed in the future. In various embodiments, a memory device 502 includes both volatile and non-volatile computer storage media.

Figure 6A:
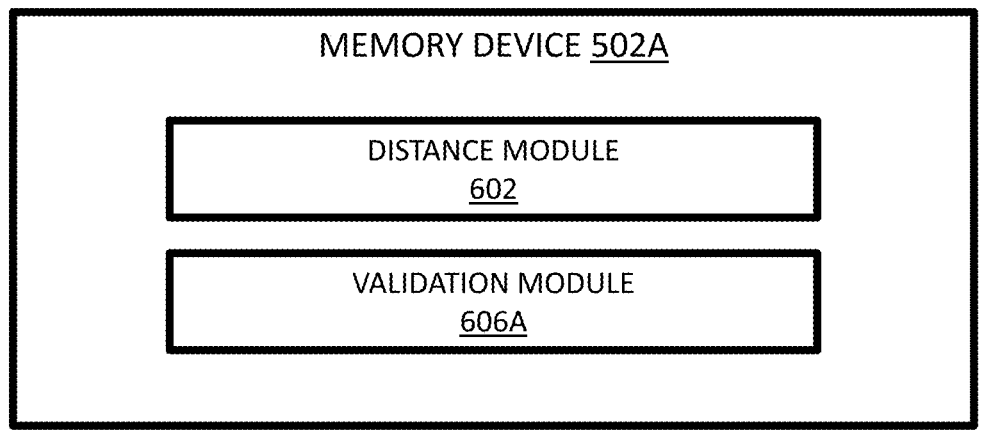
FIGS. 6A and 6B are schematic block diagrams illustrating various embodiments of a memory device included in the host computing devices of FIGS. 5A and 5B.

Referring to FIG. 6A, FIG. 6A is a block diagram of one embodiment of a memory device 502A included in a host 104. At least in the embodiment illustrated in FIG. 6A, a memory device 502A includes, among other components and/or features, a distance module 602 and a validation module 606A that are each configured to operate/function in conjunction with one another when executed by a processor (e.g., processor 504) to validate computing devices 102 and/or digital certificates that include a geographic extension.

A distance module 602 may include any suitable hardware and/or software that can calculate and/or determined a current distance between a host 104 and a computing device 102. In various embodiments, the distance module 602 is configured to receive a digital certificate that includes a distance value populating a geographic extension from a computing device 102 and calculate/determine the current distance between the host 104 and the computing device 102 using the distance value of the geographic extension.

The distance module 602 is configured to store the location/position of the host 104. In some embodiments, the location/position of the host 104 is represented as a latitude La point on the elliptic curve by applying an elliptic curve addition operation similar to the various embodiments of the computing device 102 discussed above. In some embodiments, the addition operation includes the following:

$$La(\phi_2, r) = \phi_2 * G + rH.$$

Similarly, the longitude (Lo) point on the elliptic curve is determined by applying an elliptic curve addition operation. In some embodiments, the addition operation includes the following:

$$Lo(\lambda_2, r) = \lambda_2 * G + rH.$$

As a result, the La point and Lo point for the host 104 can be represented as a second pair of ECC points (e.g., a third ECC point and a fourth ECC point). Further, C(La) is an ECC point over latitude and C(Lo) is an ECC point over longitude for the host 104. For ease in understanding the various distance calculations set forth below, C(La1) will be used to refer to the ECC point over latitude for the computing device 102, C(Lo1) will be used to refer to the ECC point over longitude for the computing device 102, C(La2) will be used to refer to the ECC point over latitude for the host 104, and C(Lo2) will be used to refer to the ECC point over longitude for the host 104. For further ease in understanding the various distance calculations set forth below, C(La1) will be represented as La1, C(Lo1) will be represented as Lo1, C(La2) will be represented as La2, and C(Lo2) will be represented as Lo2.

In some embodiments, the distance module 602 is configured to utilize the distance value of the geographic extension to calculate/determine a small (short) and/or relatively small (short) current distance between the host 104 and the computing device 102 (e.g., distances less than or equal to about 100 miles). In additional or alternative embodiments, the distance module 602 is configured to utilize the distance value of the geographic extension to calculate/determine a large (long) and/or relatively large (long) current distance between the host 104 and the computing device 102 (e.g., distances greater than about 100 miles).

In various embodiments, the distance module is configured to calculate a Euclidean distance d1 when calculating and/or determining a small and/or relatively small current distance. In some embodiments, the Euclidean distance d1 is calculated utilizing a Pythagorean theorem formula (e.g., $d1^2 = a^2 + b^2$, in which d1 is the distance between the host 104 and the computing device 102 and a and b are the difference between the locations/positions of the host 104 and the computing device 102). Further, the Pythagorean theorem formula uses La1, La2, Lo1, and Lo2 to determine the current distance between the computing device 102 and the host 104 (or how far away the computing device 102 is from the host 104). In these embodiments, the Pythagorean theorem formula includes the following calculation: $d1 = ((La2-La1)^2 + (Lo2-Lo1)^2)^{1/2}$. Here, a and b can be computed (searched) as $C(La2) - C(La1) < a*G$ and $C(Lo2) - C(Lo1) < b*G$. By knowing (searched) a and b, the Euclidean distance d1 can be obtained from $d1 = (a^2 + b^2)^{1/2}$.

In various embodiments, the distance module 602 is configured to transmit the distance d1 to the validation module 606A. Further, the validation module 606A is configured to receive the distance d1 from the distance module 602.

In additional or alternative embodiments, the distance module is configured to calculate a nautical distance d2 when calculating and/or determining a large and/or relatively large current distance. In some embodiments, the nautical distance d2 is calculated utilizing a haversine formula. Further, the haversine formula uses La1, La2, Lo1, and Lo2 to determine the current distance between the computing device 102 and the host 104 (or how far away the computing device 102 is from the host 104). In these embodiments, the haversine formula includes the following calculations:

$$a = \sin^2(\Delta\phi/2) + \cos\phi_1 * \cos\phi_2 * \sin^2(\Delta\lambda/2)$$

$$b = 2 * \text{atan2}(a^{1/2}, (1-a)^{1/2})$$

$$d = R * c,$$

in which $\phi$ is the latitude $\lambda$ is the longitude, R is the radius of the earth (e.g., mean R=3,958,756 miles or 6,371 kilometers), and A is the difference between values. Notably, the calculations should be made with the angles in radians.

In various embodiments, the distance d2 is calculated based on the difference between C(La2) and C(La1) and the difference between C(Lo2) and C(Lo1). Specifically, the difference between C(La2) and C(La1) can be computed as follows:

$$C(La2) - C(La1) = (La2G - La1*G) - (rH2 - rH1) = (La2 - La1)*G + (R2 - R1)*H.$$

Further, the difference between C(Lo2) and C(Lo1) can be computed as follows:

$$C(Lo2) - C(Lo1) = (Lo2G - Lo1*G) - (rH2 - rH1) = (Lo2 - Lo1)*G + (R2 - R1)*H.$$

Further, in determining the distance d2, the distance module 602 is configured to use searching functions to determine if a set of conditions is met. In some embodiments, a condition includes determining if La2−La1<d3 and/or Lo2−Lo1<d3, in which d3 is a predetermined and/or preset distance (e.g., any suitable distance). In other words, determining if the computing device 102 is greater than the predetermined distance d3 away from the host 104. The calculation for the latitude points can be represented as:

$C(La2)-C(La1)<C(d3)$; or $La2*G-La1*G+R1*H-R2*H-d3*G+RH<0.$

The calculation for the longitude points can be represented as:

$C(Lo2)-C(Lo1)<C(d3)$; or $Lo2*G-Lo1*G+R1*H-R2*H-d3*G+RH<0.$

Here, if either condition is false, the location of the host 104 is greater than the predetermined distance d3. Conversely, if both conditions are true, the location of the host 104 is less than or equal to the predetermined distance d3 (see, e.g., FIG. 16A).

In various embodiments, the distance module 602 is configured to notify the validation module 606A of whether the location of the host 104 is less than or equal to the predetermined distance d3 (e.g., both conditions are true) or greater than the predetermined distance d3 (e.g., one condition is false or both conditions are false) from the computing device 102. Further, the validation module 606A is configured to receive the notification from the distance module 602.

A validation module 606A may include any suitable hardware and/or software that can validate a computing device 102 and/or a digital certificate that includes a geographic extension. In various embodiments, the validation module 606A is configured to validate the computing device 102 based on whether the digital certificate for the computing device 102 that includes the geographic extension is validated. That is, the validation module 606A is configured to validate the computing device 102 in response to validating the digital certificate for the computing device 102 that includes the geographic extension and to not validate (or fail to validate) the computing device 102 in response to not validating (or failing to validate) the digital certificate for the computing device 102 that includes the geographic extension.

In various embodiments (e.g., small distances and/or relatively small distances (e.g., distance d1)), the validation module 606A is configured to compare the distance value in the geographic extension of the digital certificate (e.g., a representation of distance d1) and a predetermined distance (e.g., a distance d3) and validate/not validate the digital certificate based on the comparison. That is, the validation module 606A is configured to validate the digital certificate for the computing device 102 that includes the geographic extension in response to determining that the distance value in the geographic extension is less than or equal to the predetermined distance d3. Conversely, the validation module 606A is configured to not validate the digital certificate for the computing device 102 that includes the geographic extension in response to determining that the distance value in the geographic extension is greater than the predetermined distance d3.

In various additional or alternative embodiments (e.g., large distances and/or relatively large distances (e.g., distance d2)), the validation module 606A is configured to validate/not validate the digital certificate based on whether the location of the host 104 is less than or equal to the predetermined distance d3 or greater than the predetermined distance d3 from the computing device 102. That is, the validation module 606A is configured to validate the digital certificate for the computing device 102 that includes the geographic extension in response to determining that both conditions are true. Conversely, the validation module 606A is configured to not validate the digital certificate for the computing device 102 that includes the geographic extension in response to determining that one condition is false or both conditions are false.

In response to validating the computing device 102 via validating the digital certificate for the computing device 102 that include the geographic extension, the validation module 606A is configured to grant the computing device's request to connect to and/or access the host 104. Further, in response to not validating the computing device 102 via not validating (or failing to validate) the digital certificate for the computing device 102 that include the geographic extension, the validation module 606A is configured to deny the computing device's request to connect to and/or access the host 104.

Figure 6B:
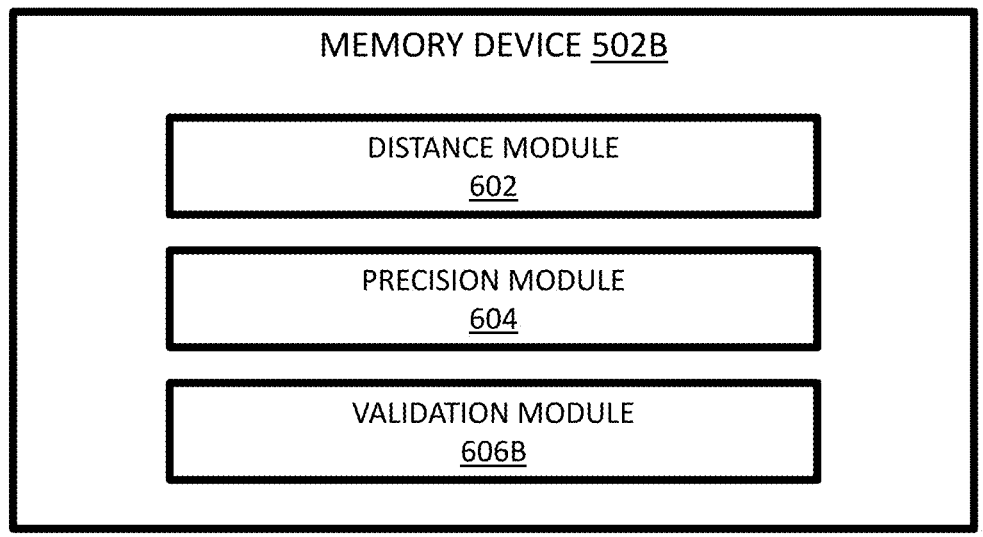

With reference to FIG. 6B, FIG. 6B is a block diagram of another embodiment of a memory device 502B. The memory device 502B includes a distance module 602 and a validation module 606B similar to the distance module 602 and validation module 606A included in the memory device 502A discussed with reference to FIG. 6A. At least in the illustrated embodiments, the memory device 502B further includes, among other components and/or features, a precision module 604.

A precision module 604 may include any suitable hardware and/or software than can determine a precise distance and/or relatively precise distance between the computing device 102 and the host 104. The precision module 604 may include any suitable degree of precision that is known or developed in the future.

Figures 16A, 16B:
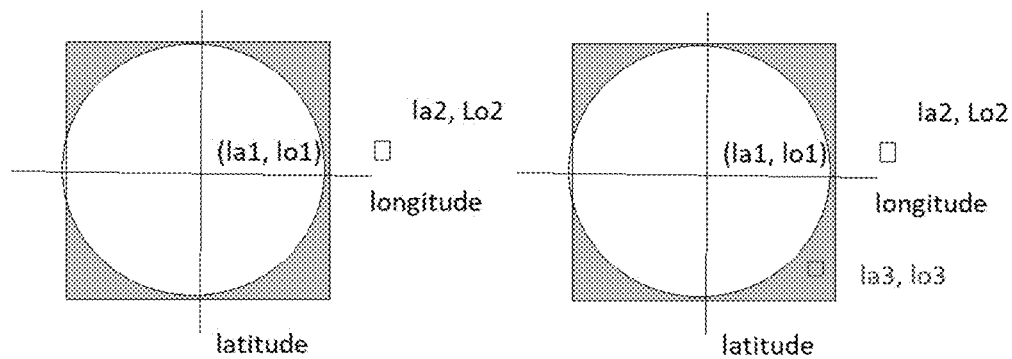
FIGS. 16A through 16C are diagrams illustrating various examples of locating a computing device and locating the computing device with a degree of precision.
Figure 16C:
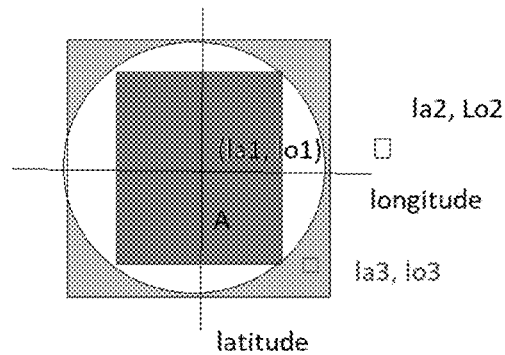

In various embodiments, the precision module 604 is configured to perform a binary search on one or more unverified parameters and/or substations (see, e.g., FIGS. 16B and 16C). In some embodiments, the binary search is performed using a Pythagorean formula (e.g., $a^2+b^2<d1$, in which a and b are the search points.

In additional or alternative embodiments, the binary search is performed using a haversine formula. Here, a more precise distance d4 can be substituted for the distance d3 in the haversine formula and the precision module 604 is configured to determine if one condition is false, both conditions are false, or both conditions are true. That is, if one condition is false or both conditions are false, the location of the computing device 102 is outside the desired and/or predetermined degree of precision. Conversely, if both conditions are true, the location of the computing device 102 is within the desired and/or predetermined degree of precision.

The precision module 604 can notify the validation module 606B of whether the location of the computing device 102 is outside or within the desired and/or predetermined degree of precision. Further, the validation module 606B is configured to receive and process the notification from the precision module 604.

In various embodiments, in addition to the operations and/or functions of the validation module 606A, the validation module 606B, in some embodiments, is further configured to validate or not validate the computing device 102 and/or digital certificate of the computing device 102 that includes the geographic extension based on whether the location of the computing device 102 is outside or within the desired and/or predetermined degree of precision.

In some embodiments, in response to determining that the computing device 102 is less than or equal to the distance d1 from the host 104, the validation module 606B is configured to validate the digital certificate (and the computing device 102) in response to determining that the binary search using a Pythagorean formula indicates that $a^2+b^2<d1$ is true (e.g., the location of the computing device 102 is within the desired and/or predetermined degree of precision). Conversely, the validation module 606B is configured to not validate the digital certificate (and the computing device 102) in response to determining that the binary search using the Pythagorean formula indicates that $a^2+b^2<d1$ is false (e.g., the location of the computing device 102 is outside the desired and/or predetermined degree of precision).

In some additional or alternative embodiments, in response to determining that both conditions are true for the location of the computing device 102 (e.g., the computing device 102 is less than or equal to the distance d3 from the host 104), the validation module 606B is configured to validate the digital certificate (and the computing device 102) in response to determining that both conditions for the binary search using the haversine formula are true (e.g., the location of the computing device 102 is within the desired and/or predetermined degree of precision). Conversely, the validation module 606B is configured to not validate the digital certificate (and the computing device 102) in response to determining that one condition or both conditions for the binary search using the haversine formula is/are false (e.g., the location of the computing device 102 is outside the desired and/or predetermined degree of precision).

In response to validating the computing device 102 via validating the digital certificate for the computing device 102 that includes the geographic extension, the validation module 606B is configured to grant the computing device's request to connect to and/or access the host 104. Further, in response to not validating the computing device 102 via not validating (or failing to validate) the digital certificate for the computing device 102 that include the geographic extension, the validation module 606B is configured to deny the computing device's request to connect to and/or access the host 104.

Referring back to FIG. 5A, a processor 504 may include any suitable non-volatile/persistent hardware and/or software configured to perform and/or facilitate performing functions and/or operations for validating computing device digital certificates that include a geographic extension. In various embodiments, the processor 504 includes hardware and/or software for executing instructions in one or more modules and/or applications that can perform and/or facilitate performing functions and/or operations for validating computing device digital certificates that include a geographic extension. The modules and/or applications executed by the processor 504 for validating computing device digital certificates that include a geographic extension can be stored on and executed from a memory device 502 (e.g., memory device 502A and memory device 502B) and/or from the processor 204.

Figure 7A:
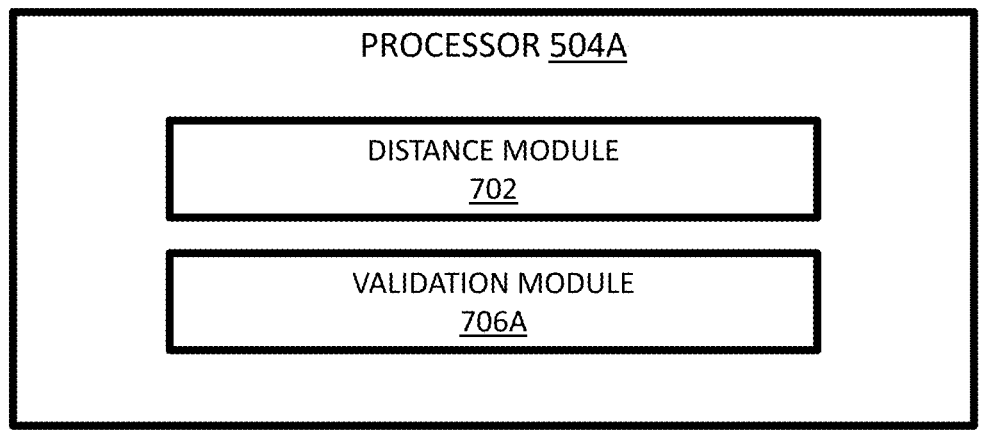
FIGS. 7A and 7B are schematic block diagrams illustrating various embodiments of a processor included in the host computing devices of FIGS. 5A and 5B.

With reference to FIG. 7A, FIG. 7A is a schematic block diagram of one embodiment of a processor 504A. At least in the illustrated embodiment, the processor 504A includes, among other components and/or features, a distance module 702 and a validation module 706A similar to the distance module 602 and validation module 606A, respectively, in the memory device 502A discussed with reference to FIG. 6A.

Figure 7B:
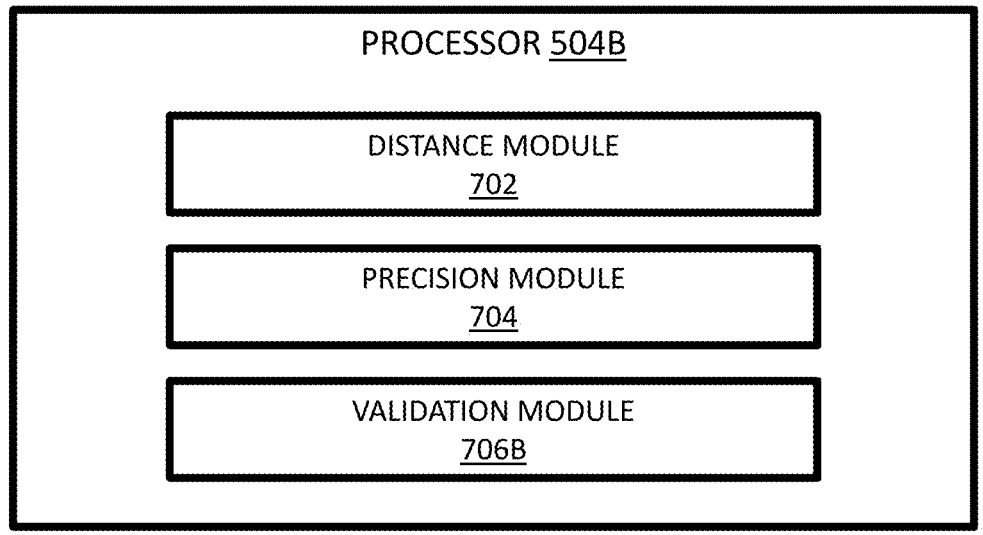

Referring to FIG. 7B, FIG. 7B is a schematic block diagram of another embodiment of a processor 504B. At least in the illustrated embodiment, the processor 504B includes, among other components and/or features, a distance module 702, a precision module 704, and a validation module 706B similar to the distance module 602, precision value module 604, and validation module 606B, respectively, in the memory device 502B discussed with reference to FIG. 6B.

Referring to FIG. 5B, FIG. 5B is a block diagram of another embodiment of a host 104B. At least in the illustrated embodiment, the host 104B includes, among other components and/or features, a set of memory devices 502, a processor 504, and a bus 506 similar to the memory device(s) 502, processor 504, and bus 506 included in the embodiment of a host 104A illustrated in FIG. 5A. A difference between the host 104B and the host 104A is that the memory device(s) 502 of the host 104B are included in and/or form a portion of the processor 504, whereas the memory device(s) 502 of the host 104A are separate from and/or are device(s) that is/are independent from the processor 504.

While the various embodiments of a host 104 are discussed with reference to the computing device 102 requesting to connect to and/or access the host 104 and the host granting/denying the request in response to validating the computing device 102 and/or digital certificate of the computing device 102, various embodiments of a host 104 contemplate the host 104 acting as a third party to a request between the computing device 102 and another computing device 102. Here, the location of the other computing device 102 can be substituted for the location of the host 104 in validating/not validating the computing device 102 and/or validating/not validating the digital certificate of the computing device 102. That is, a request to connect to and/or access the other computing device 102 will be granted/denied by the host 104 in response to validating/not validating the computing device 102 and/or validating/not validating the digital certificate of the computing device 102.

With reference to FIG. 8, FIG. 8 is a block diagram of another embodiment of a computing system 800 that includes and/or can provide computing device digital certificates that include a geographic extension. The computing system 800 may include and/or form at least a portion of any suitable type of computing system and/or particular computing system that is known or developed in the future.

In various embodiments, the computing system 800 may include and/or form at least a portion of a home edge system/network, a datacenter system/network, and/or a communication system/network (e.g., a cellular system/network, a vehicle communication system/network, an internal office communication system/network, etc.), etc., among other types of systems/networks and/or particular systems/networks that are possible, each of which is contemplated herein. That is, the computing system 800 may include and/or form at least a portion of any suitable system and/or suitable network that is capable of benefitting from and/or utilizing TLS and end user digital certificates with enhanced security features that can be locked and/or limited to a predetermined/predefined geographic boundary and/or within a specific geographic location. At least in the embodiment illustrated in FIG. 8, a computing system 800 includes, among other components and/or features, a host computing device 802 (or host 802) and a computing device 804 coupled to and/or in communication with each other via and/or over a network 806.

A host 802 may include any suitable type of computing device and/or computing device that is known or developed in the future. In some embodiments, a host 802 may include and/or form at least a portion of a server system and/or a set of server devices (e.g., computing hardware and/or software that provides a set of computing services). Further, a host 802 may also include and/or be referred to herein as, an information handling device. Examples of a host 802 include, but are not limited to, a server, a laptop computer, a desktop computer, a PDA, a tablet computer, a smart phone, a cellular telephone, a wearable device (e.g., a smart watch, a smart ring, a fitness tracker, etc.), an IoT device, a game console, an on-board computer of a vehicle (e.g., a motor vehicle (e.g., an automobile, truck, bus, motorcycle, etc.), an aquatic vehicle (e.g., a boat, ship, submarine, etc.), and an aircraft (e.g., an airplane, helicopter, UAV, drone, blimp, hot air balloon, airship, rocketship, space shuttle, space station, etc.), etc.), a streaming device, a smart device (e.g., a smart speaker (e.g., Alexa®, Echo®, Google Home®, etc.), a smart hub, and a stick device (e.g., Fire Stick®, Roku Stick®, etc.), etc.), and a digital assistant, etc., among other types of computing systems/devices and/or specific computing systems/devices that can perform the functions and/or operations of a host 104 discussed herein that are possible, each of which is contemplated herein.

A computing device 804 may include any suitable type of computing device and/or computing device that is known or developed in the future. In some embodiments, a computing device 804 may include and/or form a client device. Further, a computing device 804 may also include and/or be referred to herein as, an information handling device. Examples of a computing device 804 include, but are not limited to, a laptop computer, a desktop computer, a PDA, a tablet computer, a smart phone, a cellular telephone, a wearable device (e.g., a smart watch, a smart ring, a fitness tracker, etc.), an IoT device, a game console, an on-board computer of a vehicle (e.g., a motor vehicle (e.g., an automobile, truck, bus, motorcycle, etc.), an aquatic vehicle (e.g., a boat, ship, submarine, etc.), and an aircraft (e.g., an airplane, helicopter, UAV, drone, blimp, hot air balloon, airship, rocketship, space shuttle, space station, etc.), etc.), a streaming device, a smart device (e.g., a smart speaker (e.g., Alexa®, Echo®, Google Home®, etc.), a smart hub, and a stick device (e.g., Fire Stick®, Roku Stick®, etc.), etc.), and a digital assistant, etc., among other types of computing systems/devices and/or specific computing systems/devices that can perform the functions and/or operations of a computing device 804 discussed herein that are possible, each of which is contemplated herein.

A network 806 may include any suitable type of wired and/or wireless network and/or particular wired and/or wireless network (e.g., public and/or private computer networks in any number and/or configuration (e.g., the Internet, an intranet, a cloud network, etc.)) that is known or developed in the future that enables the computing device(s) 802 and the host 802 to be coupled to, communicate with, and/or to share resources with each other. In various embodiments, the network 806 can include the Internet, an IAN, a WAN, a LAN, a WLAN, a MAN, an EPN, a VPN, and/or a PAN, among other examples of computing networks and/or sets of computing devices connected together for the purpose of communicating, sharing data, and/or sharing resources with one another that are possible and contemplated herein.

With reference to FIG. 9A, FIG. 9A is a block diagram of one embodiment of a host 802A included in the system 800 discussed with reference to FIG. 8. At least in the illustrated embodiment, the host 802A includes, among other components and/or features, a set of memory devices 902 coupled to and/or in communication with a processor 904 via a bus 906 (e.g., a wired and/or wireless bus).

A set of memory devices 902 may include any suitable quantity of memory devices 902. Further, a memory device 902 may include any suitable type of device and/or system that is known or developed in the future that can store computer-useable code and/or computer-readable code. In various embodiments, a memory device 502 may include one or more non-transitory computer-usable mediums (e.g., readable, writable, readable-writable, etc.), which may include any non-transitory and/or persistent apparatus or device that can contain, store, communicate, propagate, and/or transport applications, instructions, data, computer programs, software, code, routines, etc., for processing by or in connection with a computer processing device (e.g., processor 904).

A memory device 902, in some embodiments, includes volatile computer storage media. For example, a memory device 902 may include RAM, including DRAM, SDRAM, and/or SRAM. In other embodiments, a memory device 902 includes non-volatile computer storage media. For example, a memory device 902 may include flash memory and/or any other suitable non-volatile computer storage device that is known or developed in the future. In various embodiments, a memory device 902 includes both volatile and non-volatile computer storage media.

Figure 10:
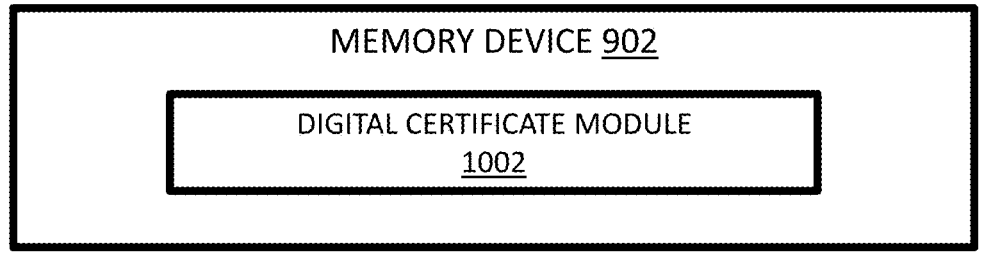
FIG. 10 is a schematic block diagram illustrating one embodiment of a memory device included in the host computing devices of FIGS. 9A and 9B.

Referring to FIG. 10, FIG. 10 is a block diagram of one embodiment of a memory device 902 included in a host 802. At least in the embodiment illustrated in FIG. 10, a memory device 902 includes, among other components and/or features, a digital certificate module 1002.

A digital certificate module 1002 may include any suitable hardware and/or software that is known or developed in the future that can manage a computing device digital certificate (e.g., a digital certificate for a host 802). The digital certificate module 1002 can manage a host digital certificate using any suitable technology, process, method, and/or technique that is known or developed in the future. In various embodiments, the digital certificate module 1002, in managing a digital certificate for a computing device 102, is configured to generate, store, provide, manage, and/or maintain the digital certificate in a memory device 802, among other operations and/or functions that can include and/or define managing a digital certificate for a host 802 that are possible and contemplated herein.

A digital certificate may include any suitable type of digital certificate and/or particular digital certificate that is known or developed in the future that can share a public key as part of an encryption and/or authentication process, technique, and/or method. That is, a digital certificate can include any type of digital certificate and/or particular digital certificate that can cryptographically link ownership of a public key with the entity that owns the public key and can also be referred to as, a public key certificate. In certain embodiments, a digital certificate can be distributed, authenticated, and revoked as part of a PKI.

In various embodiments, the digital certificate for the host 802 includes an X.509 certificate. In some embodiments, the X.509 certificate includes at least a geographic extension that can be used in validating and/or facilitate validating the computing device 804 (e.g., self-validating by the computing device 804). The geographic extension, in certain embodiments, is defined by name, criticality, and a distance value, which represent a one-way encrypted value of the current location of the host 802. The one-way encrypted value of the current location of the host 802 included in the geographic extension, in various embodiments, allows and/or enables a computing device 804 to identify and/or "see" the distance between the current location of the computing device 804 and the host 802.

In various embodiments, the geographic extension is a field in the X.509 certificate for the host 802 populated with the distance value. That is, the field for the geographic extension in the X.509 certificate is populated with a distance value that represents the location of the host 802, which includes a fixed and/or static location.

The distance value in the geographic extension of the digital certificate for the host 802 may include the C(La2) and C(Lo2) ECC values discussed above with reference to the host 104. Further, C(La2) and C(Lo2) can be referred to as, La2 and Lo2 similar to the various discussions above.

In some embodiments, the digital certificate module 1002 is configured to transmit the digital certificate for the host 802 to the computing device 804 in response to the computing device 804 requesting connection and/or access to the host 802. In additional or alternative embodiments, the digital certificate module 1002 is configured to transmit the digital certificate for the host 802 to the computing device 804 in response to the computing device 804 requesting the digital certificate for the host 802.

Referring back to FIG. 9A, a processor 904 may include any suitable non-volatile/persistent hardware and/or software configured to perform and/or facilitate performing functions and/or operations for computing device digital certificates that include a geographic extension. In various embodiments, the processor 904 includes hardware and/or software for executing instructions in one or more modules and/or applications that can perform and/or facilitate performing functions and/or operations for computing device digital certificates that include a geographic extension. The modules and/or applications executed by the processor 904 for computing device digital certificates that include a geographic extension can be stored on and executed from a memory device 902 and/or from the processor 904.

Figure 11:
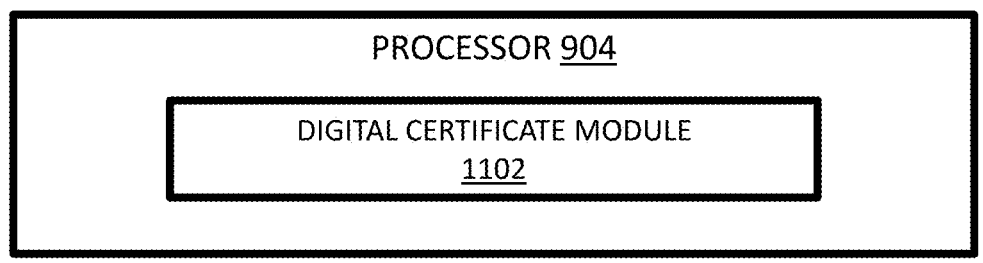
FIG. 11 is a schematic block diagram illustrating one embodiment of a processor included in the host computing devices of FIGS. 9A and 9B.

With reference to FIG. 11, FIG. 11 is a schematic block diagram of one embodiment of a processor 904. At least in the illustrated embodiment, the processor 904 includes, among other components and/or features, a digital certificate module 1102 similar to the digital certificate module 1002 in the memory device 902 discussed with reference to FIG. 10.

Referring to FIG. 9B, FIG. 9B is a block diagram of another embodiment of a host 902B. At least in the illustrated embodiment, the host 902B includes, among other components and/or features, a set of memory devices 902, a processor 904, and a bus 906 similar to the memory device(s) 902, processor 904, and bus 906 included in the embodiment of a host 902A illustrated in FIG. 9A. A difference between the host 902B and the host 902A is that the memory device(s) 902 of the host 902B are included in and/or form a portion of the processor 904, whereas the memory device(s) 902 of the host 902A are separate from and/or are device(s) that is/are independent from the processor 904.

Figure 12A:
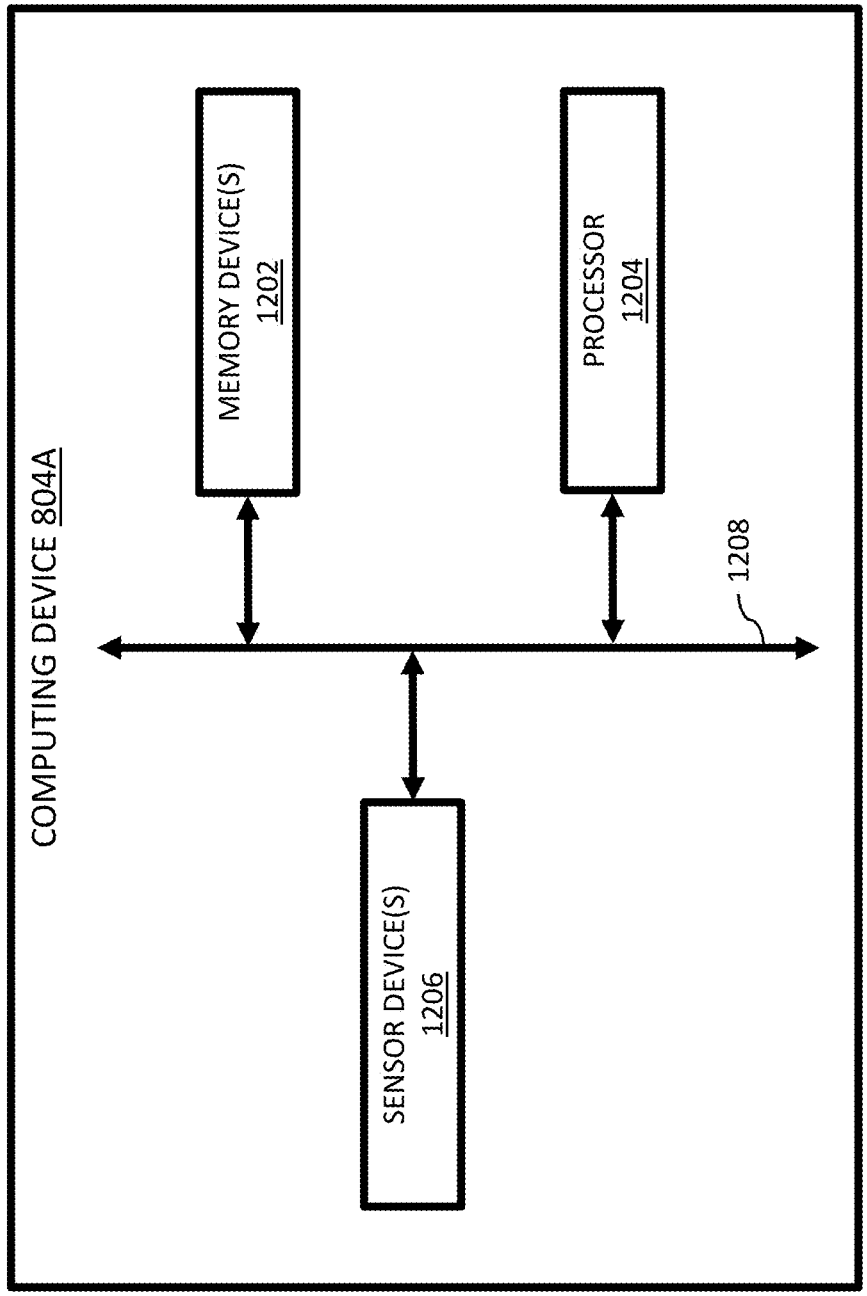
FIGS. 12A and 12B are schematic block diagrams illustrating various embodiments of a client device included in the computing system of FIG. 8.

With reference to FIG. 12A, FIG. 12A is a block of one embodiment of a computing device 804A. At least in the embodiment illustrated in FIG. 12A, a computing 804A includes, among other components and/or features, a set of memory devices 1202, a processor 1204, and a set of sensor devices 1206 coupled to and/or in communication with one another via a bus 1208 (e.g., a wired and/or wireless bus).

A set of memory devices 1202 may include any suitable quantity of memory devices 1202. Further, a memory device 1202 may include any suitable type of device and/or system that is known or developed in the future that can store computer-useable code and/or computer-readable code. In various embodiments, a memory device 1202 may include one or more non-transitory computer-usable mediums (e.g., readable, writable, readable-writable, etc.), which may include any non-transitory and/or persistent apparatus or device that can contain, store, communicate, propagate, and/or transport applications, instructions, data, computer programs, software, code, routines, etc., for processing by or in connection with a computer processing device (e.g., processor 204).

A memory device 1202, in some embodiments, includes volatile computer storage media. For example, a memory device 1202 may include RAM, including DRAM, SDRAM, and/or SRAM. In other embodiments, a memory device 1202 includes non-volatile computer storage media. For example, a memory device 1202 may include flash memory and/or any other suitable non-volatile computer storage device that is known or developed in the future. In various embodiments, a memory device 1202 includes both volatile and non-volatile computer storage media.

Figure 13A:
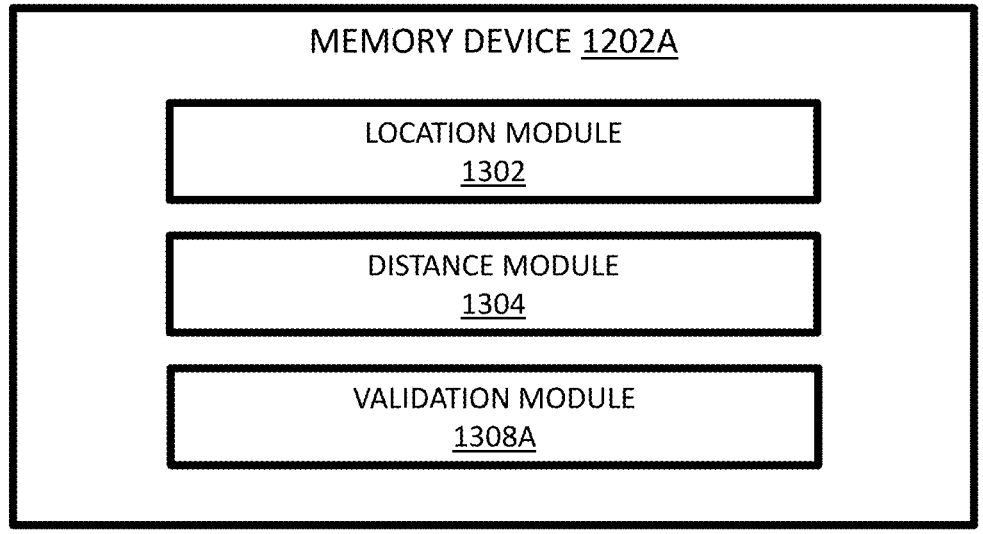
FIGS. 13A and 13B are schematic block diagrams illustrating various embodiments of a memory device included in the client devices of FIGS. 12A and 12B.

With reference to FIG. 13A, FIG. 3A is a block diagram of one embodiment of a memory device 1202A included in a computing device 804. At least in the embodiment illustrated in FIG. 13A, a memory device 1202A includes, among other components and/or features, a location module 1302, a distance module 1304, and a validation module 1308A that are each configured to operate/function in conjunction with one another when executed by a processor (e.g., processor 1204) to validate the computing device 804 (e.g., self-validate computing device 804).

A location module 1302 may include any suitable hardware and/or software that can determine a current location/position for a computing device 804. The location module 1302 may determine the current location/position for the computing device 804 similar to the various embodiments of the location module 304 discussed above with reference to FIG. 3A. Further, the location module 1302 is configured to transmit the determined La1 and Lo1 for the computing device 804 to the distance module 1304.

The distance module 1304 is configured to receive the determined La1 and Lo1 for the computing device 804 from the location module 1302. Further, the distance module 1304 is configured to receive the digital certificate from the host 802 that includes the geographic extension with the populated distance value (e.g., La2 and Lo2).

In various embodiments, the distance module 1304 is configured to utilize La1, La2, Lo1, and Lo2 to determine the Euclidean distance d1 between the computing device 804 and the host 802 similar to various embodiments of the distance module 602 discussed above with reference to FIG. 6A. The distance module 1304 is configured to transmit the determined Euclidean distance d1 to the validation module 1308A.

In various additional or alternative embodiments, the distance module 1304 is configured to utilize La1, La2, Lo1, and Lo2 to determine the nautical distance d2 between the computing device 804 and the host 802 similar to various embodiments of the distance module 602 discussed above with reference to FIG. 6A. The distance module 1304 is configured to transmit a notification of whether both conditions are true (e.g., the location of the host 802 is less than or equal to the predetermined distance d3) or one or both of the conditions are false (e.g., the location of the host 104 is greater than the predetermined distance d3) to the validation module 1308A, similar to the various embodiments discussed above.

A validation module 1308A may include any suitable hardware and/or software capable of validating (self-validating) the computing device 804. In various embodiments, the validation module 1308A is configured to validate (e.g., self-validate) the computing device 804 based on the Euclidean distance d1 being less than or equal to a predetermined distance d3 and/or based on both conditions being true or one or more conditions being false, as discussed above.

In some embodiments, the validation module 1308A is configured to validate (e.g., self-validate) the computing device 804 in response to the Euclidean distance d1 being less than or equal to the predetermined distance d3. Conversely, the validation module 1308A is configured to not validate the computing device 804 in response to the Euclidean distance d1 being greater than the predetermined distance d3.

In additional or alternative embodiments, the validation module 1308A is configured to validate (e.g., self-validate) the computing device 804 in response to both conditions being true (e.g., the location of the host 802 is less than or equal to the predetermined distance d3). Conversely, the validation module 1308A is configured to not validate the computing device 804 in response to one or more both conditions being false (e.g., the location of the host 802 is greater than the predetermined distance d3).

In response to validating (self-validating) the computing device 804, the validation module 1308A is configured to enable and/or allow the computing device 804 to perform is various operations and/or functions. In response to not validating the computing device 804, the validation module 1308A is configured to prevent the computing device 804 from performing is various operations and/or functions and/or at least temporarily disable the computing device 804.

Figure 13B:
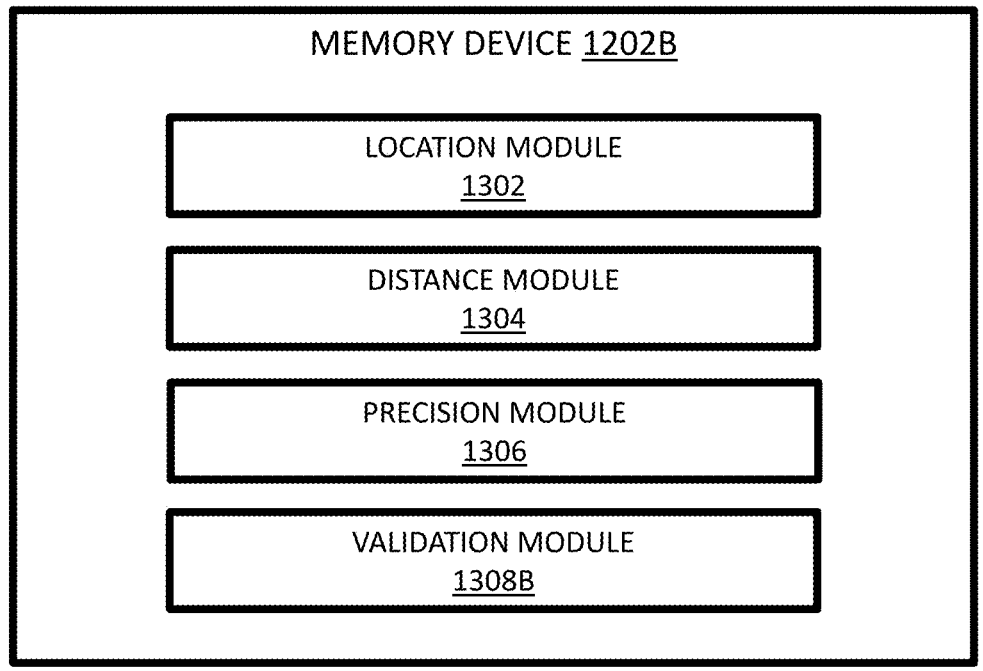

With reference to FIG. 13B, FIG. 13B is a block diagram of another embodiment of a memory device 1202B. The memory device 1202B includes a location module 1302, a distance module 1304, and a validation module 1308B similar to the location module 1302, distance module 1304, and validation module 1308A included in the memory device 2102A discussed with reference to FIG. 13A. At least in the illustrated embodiment, the memory device 1202B further includes, among other components and/or features, a precision module 1306.

A precision module 1306 may include any suitable hardware and/or software than can determine a precise distance and/or relatively precise distance between the computing device 804 and the host 802. In various embodiments, the precision module 604 is configured to perform a binary search on one or more unverified parameters and/or sub stations.

In some embodiments, the binary search is performed using a Pythagorean formula, as discussed above with reference to the precision module 604 illustrated in FIG. 6B. In additional or alternative embodiments, the binary search is performed using a haversine formula, as further discussed above with reference to the precision module 604 illustrated in FIG. 6B.

The precision module 1306 can notify the validation module 1308B of whether the location of the computing device 804 is outside or within the desired and/or predetermined degree of precision. Further, the validation module 1308B is configured to receive and process the notification from the precision module 1306.

In various embodiments, in addition to the operations and/or functions of the validation module 1308A, the validation module 1308B, in some embodiments, is further configured to validate (e.g., self-validate) or not validate the computing device 804 based on whether the location of the computing device 804 is outside or within the desired and/or predetermined degree of precision, as discussed above.

In some embodiments, in response to determining that the computing device 804 is less than or equal to the distance d1 from the host 802, the validation module 1308B is configured to validate the computing device 804 in response to determining that the binary search using a Pythagorean formula indicates that $a^2+b^2<d1$ is true (e.g., the location of the computing device 804 is within the desired and/or predetermined degree of precision). Conversely, the validation module 1308B is configured to not validate the computing device 804 in response to determining that the binary search using the Pythagorean formula indicates that $a^2+b^2<d1$ is false (e.g., the location of the computing device 804 is outside the desired and/or predetermined degree of precision).

In some additional or alternative embodiments, in response to determining that both conditions are true for the location of the computing device 804 (e.g., the computing device 804 is less than or equal to the distance d3 from the host 802), the validation module 1308B is configured to validate (self-validate) the computing device 804 in response to determining that both conditions for the binary search using the haversine formula are true (e.g., the location of the computing device 804 is within the desired and/or predetermined degree of precision). Conversely, the validation module 1308B is configured to not validate the computing device 804 in response to determining that one condition or both conditions for the binary search using the haversine formula is/are false (e.g., the location of the computing device 804 is outside the desired and/or predetermined degree of precision).

In response to validating (self-validating) the computing device 804, the validation module 1308B is configured to enable and/or allow the computing device 804 to perform is various operations and/or functions. In response to not validating the computing device 804, the validation module 1308B is configured to prevent the computing device 804 from performing is various operations and/or functions and/or at least temporarily disable the computing device 804.

Referring back to FIG. 12A, a processor 1204 may include any suitable non-volatile/persistent hardware and/or software configured to perform and/or facilitate performing functions and/or operations for validating (e.g., self-validating) a computing device 804. In various embodiments, the processor 1204 includes hardware and/or software for executing instructions in one or more modules and/or applications that can perform and/or facilitate performing functions and/or operations for validating (e.g., self-validating) a computing device 804. The modules and/or applications executed by the processor 1204 for validating (e.g., self-validating) a computing device 804 can be stored on and executed from a memory device 1202 and/or from the processor 1204.

Figure 14A:
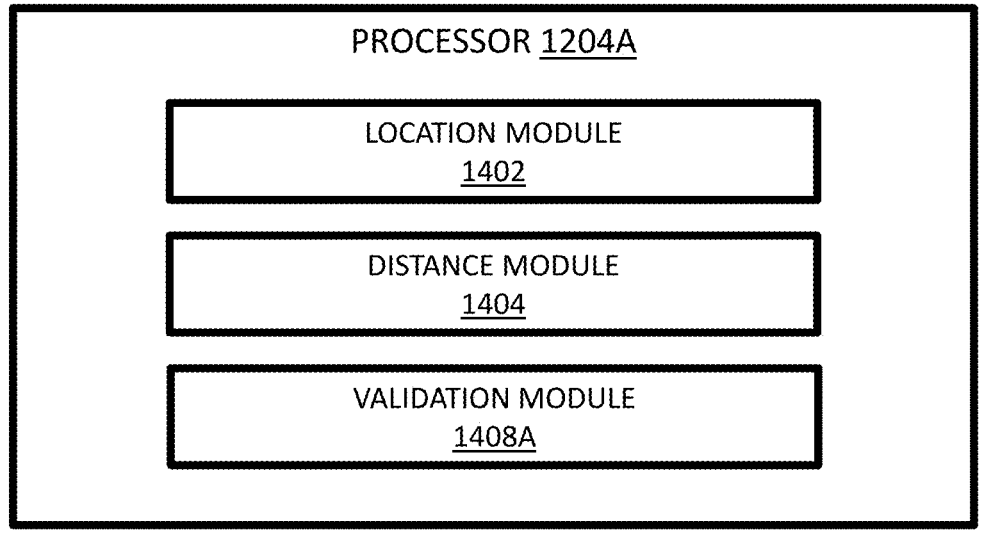
FIGS. 14A and 14B are schematic block diagrams illustrating various embodiments of a processor included in the client devices of FIGS. 12A and 12B.

With reference to FIG. 14A, FIG. 14A is a schematic block diagram of one embodiment of a processor 1204A. At least in the illustrated embodiment, the processor 1204A includes, among other components and/or features, a location module 1402, a distance module 1404, and a validation module 1408A similar to the location module 1302, distance module 1304, and validation module 1308A included in the memory device 1202A discussed with reference to FIG. 12A.

Figure 14B:
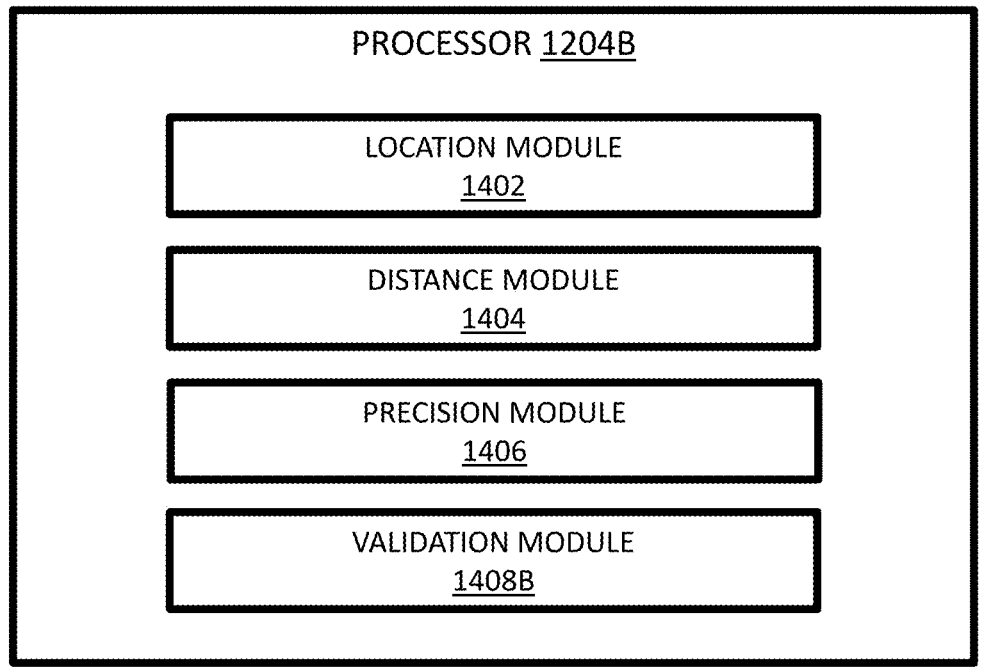

Referring to FIG. 14B, FIG. 14B is a schematic block diagram of another embodiment of a processor 1204B. At least in the illustrated embodiment, the processor 1204B includes, among other components and/or features, a location module 1402, a distance module 1404, a precision module 1406, and a validation module 1408B similar to the location module 1302, distance module 1304, precision module 1306, and validation module 1308B included in the memory device 1202B discussed with reference to FIG. 12B.

With reference again to FIG. 12A, a sensor device 1206 may include any suitable sensor device 1206 that is known or developed in the future that can detect, sense, and/or measure physical inputs indicative of a current location/position of the computing device 804. In various embodiments, the sensor device 1206 can include any suitable device and/or system that can determine and/or identify the current latitudinal point and/or coordinate and the current longitudinal point and/or coordinate of the computing device 804. In some embodiments the sensor device 1206 includes a GPS, among other devices and/or systems that can determine and/or identify the current latitudinal point and/or coordinate and the current longitudinal point and/or coordinate of the computing device 804 that are possible and contemplated herein.

Figure 12B:
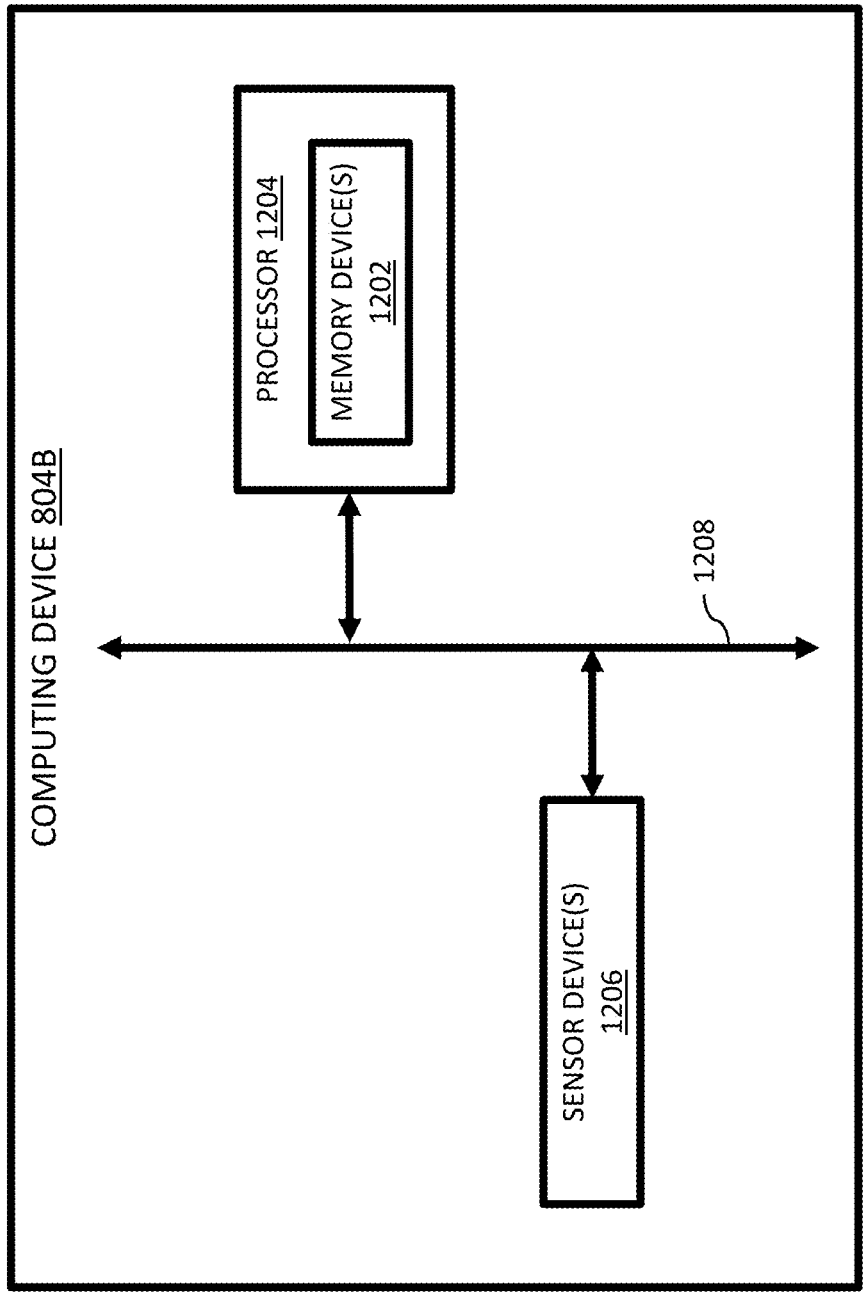

Referring to FIG. 12B, FIG. 12B is a block diagram of another embodiment of a computing device 804B. At least in the illustrated embodiment, the computing device 804B includes, among other components and/or features, a set of memory devices 1202, a processor 1204, a sensor device 1206, and a bus 1208 similar to the memory device(s) 1202, processor 1204, sensor device 1206, and bus 1208 included in the embodiment of a computing device 804A illustrated in FIG. 12A. A difference between the computing device 804B and the computing device 804A is that the memory device(s) 1202 of the computing device 804B are included in and/or form a portion of the processor 1204, whereas the memory device(s) 1202 of the computing device 804A are separate from and/or are device(s) that is/are independent from the processor 1204.

In some embodiments, the processor 1204 (e.g., processor 1204A and processor 1204B) is configured to transmit a request to the host 802 to connect to and/or access the host 802 (e.g., an attempt by the computing device 804 to connect to and/or access the host 802). In response to the request, the host 802 is configured to transmit its digital certificate including the geographic extension populated with the distance value (e.g., an X.509 certificate) and the computing device 804 is configured to receive the digital certificate for the host 802 including the geographic extension populated with the distance value.

In additional or alternative embodiments, the processor 1204 (e.g., processor 1204A and processor 1204B) is configured to transmit a request to the host 802 to receive the digital certificate (e.g., an X.509 certificate) that includes a geographic extension populated with the distance value in response to a user attempting to use the computing device 804. In response to the request, the host 802 is configured to transmit its digital certificate including the geographic extension populated with the distance value (e.g., an X.509 certificate) and the computing device 804 is configured to receive the digital certificate for the host 802 including the geographic extension populated with the distance value. The digital certificate for the host 802 enables and/or allows the computing device 804 to validate itself (e.g., self-validate), which can result in the computing device 804 accessing the host 802 and/or performing its various operations and/or functions.

While the various embodiments discussed herein are made with reference to ECC homomorphic calculations, the various embodiments are not limited to ECC homomorphic calculations. That is, various other embodiments can be based on other homomorphic encryption schemas including, but not limited to, RSA based cryptosystems, ElGamal cryptosystems, and Pallier cryptosystems, etc., among other schemas that are possible, each of which is contemplated herein.

Figure 17:
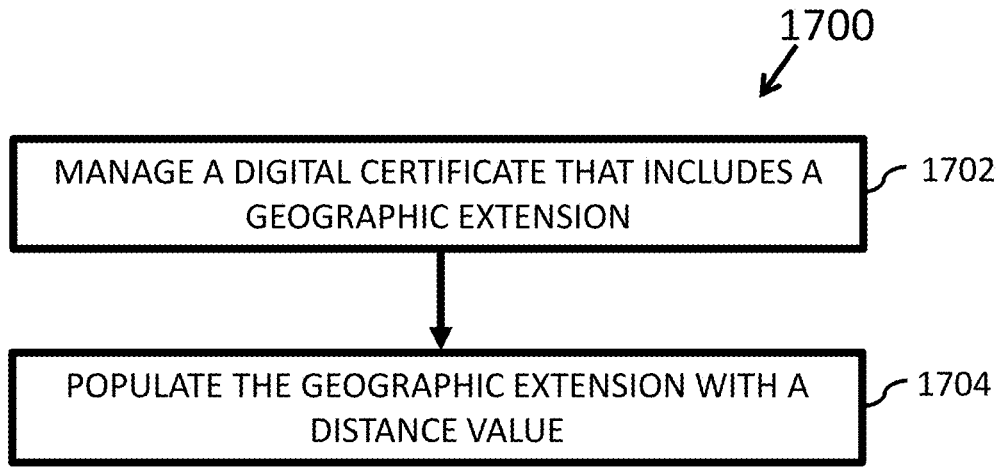
FIG. 17 is a schematic flow chart diagram illustrating one embodiment of a method for computing device digital certificates that include a geographic extension.

FIG. 17 is a schematic flow chart diagram illustrating one embodiment of a method 1700 for computing device digital certificates that include a geographic extension. At least in the illustrated embodiment, the method 1700 begins by a processor (e.g., processor 204) managing a digital certificate for a computing device 102, the digital certificate including a geographic extension (block 1702). The processor 204 can manage the digital certificate using any of the various embodiments, operations, and/or functions of a processor 204 for managing a digital certificate discussed elsewhere herein.

Figure 18:
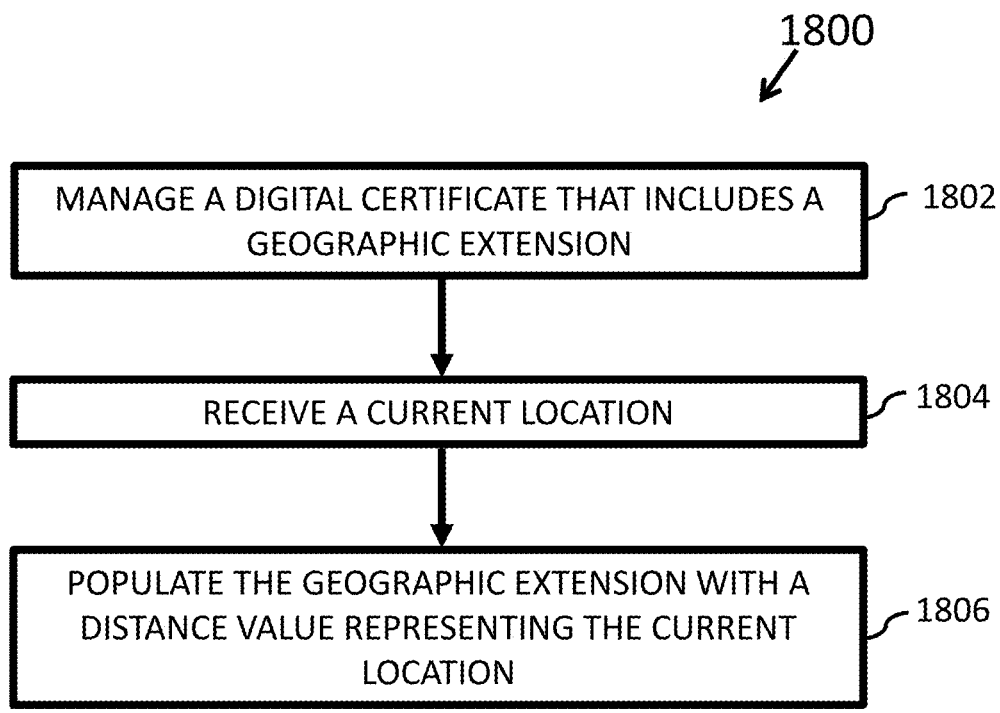
FIG. 18 is a schematic flow chart diagram illustrating another embodiment of another method for computing device digital certificates that include a geographic extension.

The processor 204 populates the geographic extension with a distance value that enables the digital certificate to be validated via the populated geographic extension (block 1704). The processor 204 can populate the geographic extension with the distance value using any of the various embodiments, operations, and/or functions of a processor 204 for populating the geographic extension with the distance value discussed elsewhere herein FIG. 18 is a schematic flow chart diagram illustrating another embodiment of a method 1800 for computing device digital certificates that include a geographic extension. At least in the illustrated embodiment, the method 1800 begins by a processor (e.g., processor 204) managing a digital certificate for a computing device 102, the digital certificate including a geographic extension (block 1802). The processor 204 can manage the digital certificate using any of the various embodiments, operations, and/or functions of a processor 204 for managing a digital certificate discussed elsewhere herein.

The processor 204 receives a current location of a computing device 102 (block 1804) and populates the geographic extension with a distance value representing the current location (block 1806). The geographic extension including the distance value enables the digital certificate to be validated. The processor 204 can populate the geographic extension with the distance value using any of the various embodiments, operations, and/or functions of a processor 204 for populating the geographic extension with the distance value discussed elsewhere herein.

Figure 19:
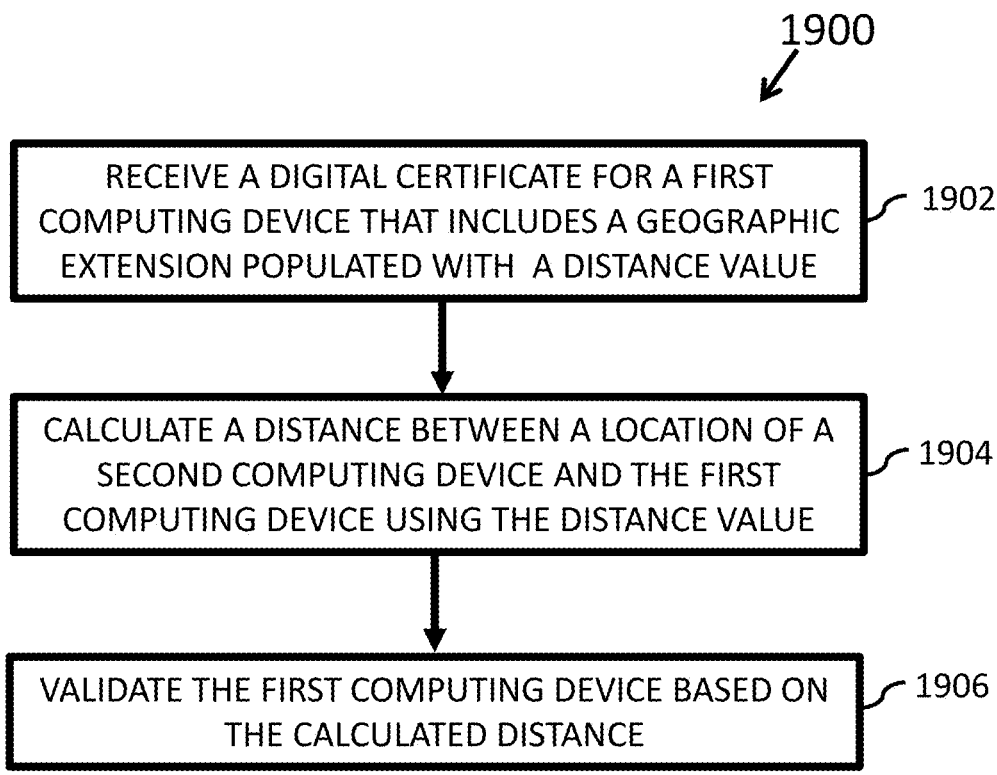
FIG. 19 is a schematic flow chart diagram illustrating one embodiment of a method for validating a computing device.

FIG. 19 is a schematic flow chart diagram illustrating one embodiment of a method 1900 for validating a computing device 102/804. At least in the illustrated embodiment, the method 1900 begins by a processor (e.g., processor 204) receiving a digital certificate for a computing device 102/804, the digital certificate including a geographic extension populated with a distance value (block 1902).

The processor 204 calculates a distance between a location of another computing device (e.g., host 104/802) and a current location of the computing device 102/804 (block 1904). The processor 204 can calculate the distance using any of the various embodiments, operations, and/or functions of a processor 204 for calculating the distance between the location of the other computing device and the current location of the computing device discussed elsewhere herein.

The method 1900 further includes the processor 204 validating the computing device 102/804 based on the calculated distance (block 1906). The processor 204 can validate the computing device 102/804 using any of the various embodiments, operations, and/or functions of a processor 204 for validating a computing device 102/804 discussed elsewhere herein.

Figure 20:
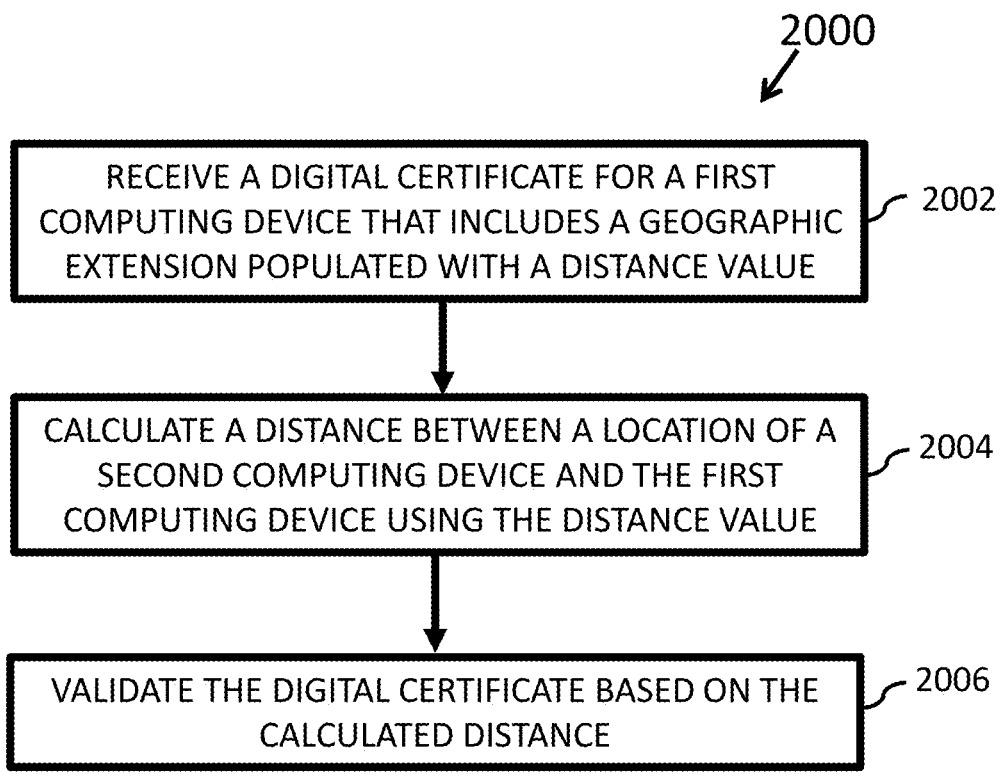
FIG. 20 is a schematic flow chart diagram illustrating one embodiment of a method for validating a digital certificate that includes a geographic extension.

FIG. 20 is a schematic flow chart diagram illustrating one embodiment of a method 2000 for validating a computing device digital certificate. At least in the illustrated embodiment, the method 2000 begins by a processor (e.g., processor 204) receiving a digital certificate for a computing device 102, the digital certificate including a geographic extension populated with a distance value (block 2002).

The processor 204 calculates a distance between a location of another computing device (e.g., host 104) and a current location of the computing device 102 (block 2004). The processor 204 can calculate the distance using any of the various embodiments, operations, and/or functions of a processor 204 for calculating the distance between the location of the other computing device and the current location of the computing device 102 discussed elsewhere herein.

The method 2000 further includes the processor 204 validating the computing device 102 based on the calculated distance (block 2006). The processor 204 can validate the computing device 102 using any of the various embodiments, operations, and/or functions of a processor 204 for validating a computing device 102 discussed elsewhere herein.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus A system, comprising:
a validating computing device; and
a computing device coupled to the validating computing device, wherein the computing device comprises:
 a first processor, and
 a first memory configured to store code executable by the first processor to:
  manage a digital certificate for a computing device, the digital certificate comprising a geographic extension, and
  populate the geographic extension with a set of one-way encrypted values that, when received by the validating computing device, enables the validating computing device to determine a raw distance between the computing device and the validating computing device and that further enables the validating computing device to validate the digital certificate of the computing device via the geographic extension populated with the set of one-way encrypted values,
 wherein:
  in populating the geographic extension with the set of one-way encrypted values for first distances that are less than a predetermined distance, the first processor is configured to:
   determine a latitude point and a longitude point for the computing device based on a current location of the computing device,
   combine the latitude point with a first blinding factor to generate a first elliptic curve cryptography (ECC) point on an elliptic curve, and
   combine the longitude point with a second blinding factor to generate a second elliptic curve cryptography point on the elliptic curve, the first and second ECC points forming a first pair of ECC points on the elliptic curve, and
 the validating computing device comprises:
  a second processor, and
  a second memory configured to store code executable by the second processor to:
   validate the digital certificate of the computing device via the geographic extension populated with the set of one-way encrypted values by utilizing a Pythagorean theorem formula to calculate a Euclidian distance between the current location of the computing device and a location of the validating computing device as a difference between the first pair of ECC points and a second pair of ECC points for the validating computing device.

2. The system of claim 1, further comprising:
a sensor device configured to determine the current location of the computing device,
wherein the first processor is further configured to generate the set of one-way encrypted values based on the current location of the computing device determined by the sensor device.

3. The system of claim 2, wherein the geographic extension populated with the set of one-way encrypted values enables the validating computing device to validate the digital certificate of the computing device for one of:
first distances between the computing device and the validating computing device that are less than the predetermined distance; and
second distances between the computing device and the validating computing device that are greater than the predetermined distance.

4. The system of claim 1, wherein the validating computing device is able to further validate the digital certificate of the computing device populated with the set of one-way encrypted values via a predetermined degree of precision calculation.

5. The apparatus of claim 3, wherein:
the geographic extension is configured to validate the digital certificate for the second distances that are greater than the predetermined distance; and
in populating the geographic extension with the distance value, the processor is configured to populate the geographic extension with a latitude point and a longitude point for use in a haversine formula.

6. The apparatus of claim 5, wherein:
the latitude point is combined with a first blinding factor to generate a first elliptic curve cryptography (ECC) point on an elliptic curve;
the longitude point is combined with a second blinding factor to generate a second ECC point on the elliptic curve;
the first ECC point and the second ECC point form a first pair of ECC points for the first computing device; and
the second computing device is able to validate the digital certificate via the geographic extension by utilizing the haversine formula to calculate the distance between the current location of the first computing device and a location of the second computing device as a difference between the first pair of ECC points and a second pair of ECC points for the second computing device.

7. A method, comprising:

managing, by a first processor, a digital certificate for validating a computing device, the digital certificate comprising a geographic extension; and populating the geographic extension with a set of one-way encrypted values that, when received by a validating computing device, enables the validating computing device to determine a raw distance between the computing device and the validating computing device and that further enables the validating computing device to validate the digital certificate via the populated geographic extension populated with the set of one-way encrypted values, wherein:

populating the geographic extension with the set of one-way encrypted values for first distances that are less than a predetermined distance comprises:

determining a latitude point and a longitude point for the computing device based on a current location of the computing device, combining the latitude point with a first blinding factor to generate a first elliptic curve cryptography (ECC) point on an elliptic curve, and combining the longitude point with a second blinding factor to generate a second elliptic curve cryptography point on the elliptic curve, the first and second ECC points forming a first pair of ECC points on the elliptic curve, and the method further comprises validating, by a second processor of the computing device, the digital certificate of the computing device via the geographic extension populated with the set of one-way encrypted values by utilizing a Pythagorean theorem formula to calculate a Euclidian distance between the current location of the computing device and a location of the validating computing device as a difference between the first pair of ECC points and a second pair of ECC points for the validating computing device.

8. The method of claim 7, further comprising:

receiving, from a sensor device, the current location of the computing device, wherein the set of one-way encrypted values is based on the current location of the computing device determined by the sensor device.

9. The method of claim 8, wherein the geographic extension populated with the set of one-way encrypted values enables the validating computing device to validate the digital certificate of the computing device for one of:

first distances between the computing device and the validating computing device that are less than the predetermined distance; and second distances between the computing device and the validating computing device that are greater than the predetermined distance.

10. The method of claim 7, wherein the validating computing device is able to further validate the digital certificate of the computing device populated with the set of one-way encrypted values via a predetermined degree of precision calculation.

11. The method of claim 9, wherein:

the geographic extension is configured to validate the digital certificate for the second distances that are greater than the predetermined distance; and populating the geographic extension with the distance value comprises populating the geographic extension with a latitude point and a longitude point for use in a haversine formula.

12. The method of claim 11, wherein:

the latitude point is combined with a first blinding factor to generate a first elliptic curve cryptography (ECC) point;

the longitude point is combined with a second blinding factor to generate a second ECC point;

the first ECC point and the second ECC point form a first pair of ECC points for the first computing device; and the second computing device is able to validate the digital certificate via the geographic extension by utilizing the haversine formula to calculate the distance between the current location of the first computing device and a location of the second computing device as a difference between the first pair of ECC points and a second pairs of ECC points for the second computing device.

13. A computer program product comprising a computer-readable storage device including code embodied therewith, the code executable by a first processor to cause the first processor to:

manage a digital certificate for validating a computing device, the digital certificate comprising a geographic extension; and populate the geographic extension with a set of one-way encrypted values that, when received by a validating computing device, enables the validating computing device to determine a raw distance between the computing device and the validating computing device and that further enables the validating computing device to validate the digital certificate of the computing device via the geographic extension populated with the set of one-way encrypted values, wherein:

in populating the geographic extension with the set of one-way encrypted values for first distances that are less than a predetermined distance, the first processor:

determines a latitude point and a longitude point for the computing device based on a current location of the computing device, combines the latitude point with a first blinding factor to generate a first elliptic curve cryptography (ECC) point on an elliptic curve, and combines the longitude point with a second blinding factor to generate a second elliptic curve cryptography point on the elliptic curve, the first and second ECC points forming a first pair of ECC points on the elliptic curve, and the validating computing device is able to validate the digital certificate of the computing device via a second processor populating the geographic extension with the set of one-way encrypted values using a Pythagorean theorem formula to calculate a Euclidian distance between the current location of the computing device and a location of the validating computing device as a difference between the first pair of ECC points and a second pair of ECC points for the validating computing device.

14. The computer program product of claim 13, wherein the code further causes the first processor to:

receive, from a sensor device, the current location of the computing device, wherein:

the set of one-way encrypted values is based on the current location of the computing device determined by the sensor device, the geographic extension populated with the set of one-way encrypted values enables the validating computing device to validate the digital certificate of the computing device for one of:

first distances between the computing device and the validating computing device that are less than the predetermined distance, and second distances between the computing device and the validating computing device that are greater than the predetermined distance.

15. The computer program product of claim 13, wherein the validating computing device is able to further validate the digital certificate of the computing device populated with the set of one-way encrypted values via a predetermined degree of precision calculation.

16. The computer program product of claim 14, wherein:

the geographic extension is configured to validate the digital certificate for the second distances that are greater than the predetermined distance; and the code that causes the processor to populate the geographic extension with the distance value comprises code that further causes the processor to populate the geographic extension with a latitude point and a longitude point for use in a haversine formula.

17. The computer program product of claim 16, wherein the code further causes the processor to:

combine the latitude point and a first blinding factor to generate a first elliptic curve cryptography (ECC) point; and combine the longitude point and a second blinding factor to generate a second ECC point;

wherein:

the first ECC point and the second ECC point form a first pair of ECC points for the first computing device, and the second computing device is able to validate the digital certificate via the geographic extension by utilizing the haversine formula to calculate the distance between the current location of the first computing device and a location of the second computing device as a difference between the first pair of ECC points and a second pairs of ECC points for the second computing device.

* * * * *